United States Patent
Acharya et al.

(10) Patent No.: US 9,171,204 B2
(45) Date of Patent: Oct. 27, 2015

(54) METHOD OF PERSPECTIVE CORRECTION FOR DEVANAGARI TEXT

(71) Applicant: QUALCOMM Incorporated, San Deigo, CA (US)

(72) Inventors: Hemanth P. Acharya, Bangalore (IN); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 13/842,985

(22) Filed: Mar. 15, 2013

(65) Prior Publication Data

US 2014/0161365 A1  Jun. 12, 2014

(30) Foreign Application Priority Data

Dec. 12, 2012  (IN) .......................... 5186/CHE/2012

(51) Int. Cl.
*G06K 9/72* (2006.01)
*G06K 9/00* (2006.01)
*G06K 9/32* (2006.01)
*G06K 9/36* (2006.01)

(52) U.S. Cl.
CPC .......... *G06K 9/00469* (2013.01); *G06K 9/3283* (2013.01); *G06K 2009/363* (2013.01)

(58) Field of Classification Search
None
See application file for complete search history.

(56) References Cited

U.S. PATENT DOCUMENTS

| | | | |
|---|---|---|---|
| 3,868,636 | A | 2/1975 | Schlang |
| 5,550,931 | A | 8/1996 | Bellegarda et al. |
| 5,970,170 | A | 10/1999 | Kadashevich et al. |
| 7,580,551 | B1 | 8/2009 | Srihari et al. |
| 2005/0008250 | A1* | 1/2005 | Lim et al. ...................... 382/266 |
| 2006/0123051 | A1 | 6/2006 | Hofman et al. |
| 2011/0081083 | A1* | 4/2011 | Lee ...................... G06K 9/2081 382/182 |
| 2013/0195376 | A1 | 8/2013 | Baheti et al. |
| 2014/0022406 | A1 | 1/2014 | Baheti et al. |
| 2014/0112571 | A1* | 4/2014 | Viera et al. ................... 382/138 |

OTHER PUBLICATIONS

Kapoor, Rajiv, Deepak Bagai, and T. S. Kamal. "Skew angle detectionof a cursive handwritten Devanagari script character image." Journal of the Indian Institute of Science 82.3 & 4 (2013): 161.*

(Continued)

*Primary Examiner* — Nirav G Patel
(74) *Attorney, Agent, or Firm* — Silicon Valley Patent Group LLP

(57) ABSTRACT

An electronic device and method identify regions that are likely to be text in a natural image or video frame, followed by processing as follows: lines that are nearly vertical are automatically identified in a selected text region, oriented relative to the vertical axis within a predetermined range −max_theta to +max_theta, followed by determination of an angle θ of the identified lines, followed by use of the angle θ to perform perspective correction by warping the selected text region. After perspective correction in this manner, each text region is processed further, to recognize text therein, by performing OCR on each block among a sequence of blocks obtained by slicing the potential text region. Thereafter, the result of text recognition is used to display to the user, either the recognized text or any other information obtained by use of the recognized text.

20 Claims, 12 Drawing Sheets

(56) References Cited

OTHER PUBLICATIONS

Arica N., et al., "A Overview of Character Recognition Focused on Off-Line Handwriting", IEEE Transactions on Systems, Man, and Cybernetics: Part C: Applications and Reviews, IEEE Service Center, Piscataway, NJ, US, vol. 31, No. 2, May 1, 2001, pp. 216-233, XP011057236, ISSN: 1094-6977, DOI: 10.1109/5326.941845 sections II, III.A figures 1, 2.

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

Chaudhuri B.B., et al., "An OCR system to read two Indian language scripts: Bangle and Devnagari (Hindi)", Proceedings of the 4th International Conference on Document Analysis and Recognition (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Cheriet M., et al., "Character Recognition Systems. A Guide for Students and Practitioners", Jan. 1, 2007, Character Recognition Systems : A Guide for Students and Practioners [Practitioners], Wiley, Hoboken, NJ, pp. I-XI,6, XP002590450, ISBN: 978-0-471-41570-1 p. 30-p. 36.

Chowdhury A.R., et al., "Text Detection of Two Major Indian Scripts in Natural Scene Images", Sep. 22, 2011, Camera-Based Document Analysis and Recognition, Springer Berlin Heidelberg, p. 42-57, XP019175802, ISBN: 978-3-642-29363-4.

International Search Report and Written Opinion—PCT/US2013/071480, International Search Authority—European Patent Office, Feb. 6, 2014.

Madhvanath., et al., "Chaincode Contour Processing for Handwritten Word Recognition", Transactions on Pattern Analysis and Machine Intelligence, IEEE, Piscataway, USA, vol. 21, No. 9, Sep. 1, 1999, pp. 928-932, XP000851871, ISSN: 0162-8828, DOI: 10.1109/34.790433 sections 2.1,2.2 figures 1, 4.

Yamaguchi T., et al., "Digit classification on signboards for telephone number recognition", Document Analysis and Recognition, 2003. Proceedings. Seventh International Conference on Aug. 3-6, 2003, Piscataway, NJ, USA,IEEE, Aug. 3, 2003, pp. 359-363, XP010656787, DOI: 10.1109/ ICDAR.2003.1227689, ISBN: 978-0-7695-1960-9 sections 1, 3, 4 figures 4-7.

Yamaguchi T.,et al., "Digit recognition in a natural scene with skew and slant normalization", International Journal of Document Analysis and Recognition (IJDAR), Springer, Berlin, DE, vol. 7, No. 2-3, Jul. 1, 2005, pp. 168-177, XP019352709, ISSN: 1433-2825, DOI 10.1007/S10032-004-0136-1 sections 1, 3, 4 figures 4-6, 8.

Lajish, V. L et al. "Fuzzy Directional Features for Unconstrained On-line Devanagari Handwriting Recognition," National Conference on Communications (NCC), 2010, pp. 1-5.

Jagannathan, L. et al. "Perspective Correction Methods for Camera-Based Document Analysis", believed to be published in Proceedings of First International Workshop on Camera Based Document Analysis and Recognition, Aug. 2005, Seoul, Korea, pp. 148-154.

Duda, R. O. et al. "Use of the Hough Transformation to Detect Lines and Curves in Pictures", published in the Communications of ACM, vol. 15, No. 1, pp. 11-15, Jan. 1972, available at http://www.ai.sri.com/pubs/files/tn036-duda71.pdf, (total of 18 pages including cover sheet).

Matas, J. et al. "Robust Wide Baseline Stereo from Maximally Stable Extremal Regions", Proc. of British Machine Vision Conference, 2002, pp. 384-393.

Shin, H. et al. "Application of Floyd-Warshall Labelling Technique: Identification of Connected Pixel Components in Binary Image", Kangweon-Kyungki Math. Jour. 14 (2006), No. 1, pp. 47-55.

Park, J-M. et al. "Fast Connected Component Labeling Algorithm Using a Divide and Conquer Technique", believed to be published in Matrix (2000), vol. 4, Issue: 1, Publisher: Elsevier Ltd, pp. 4-7.

Baumann, R. et al. "Automatic Perspective Correction of Manuscript Images", believed to be published in Lecture Notes in Computer Science vol. 7634, 2012, pp. 11-18 , Springer-Verlag Berlin Heidelberg 2012.

\* cited by examiner

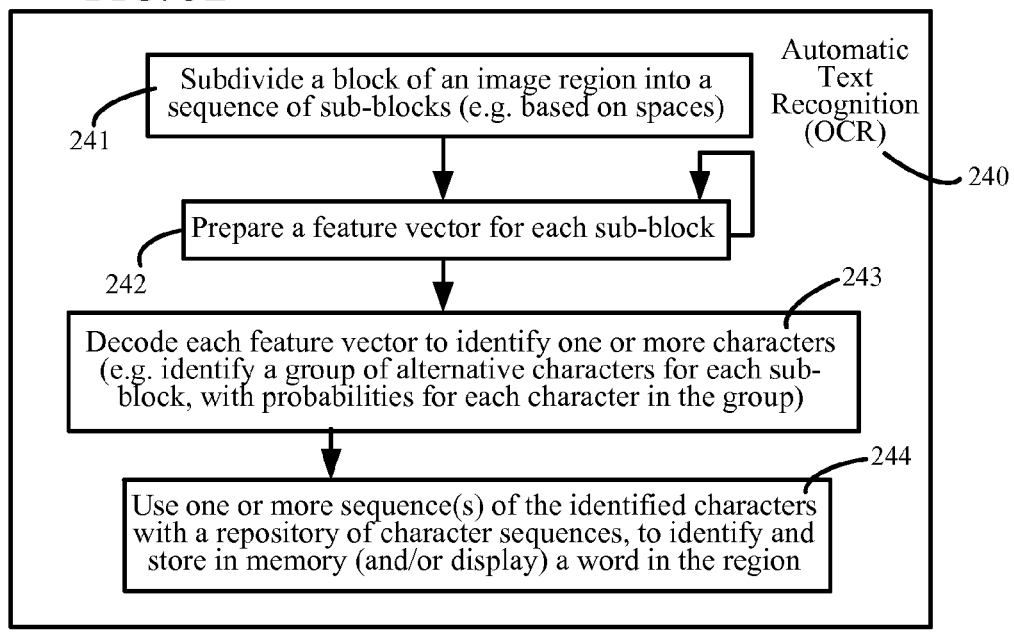
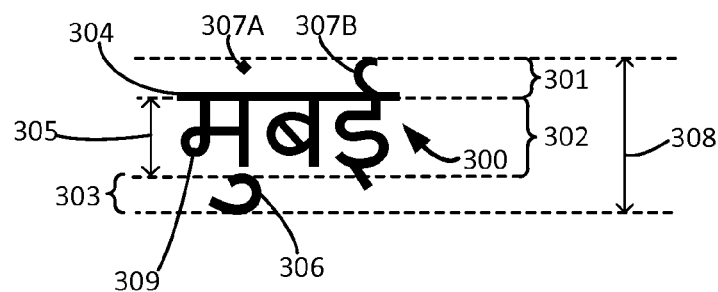

FIG. 4A (prior art)
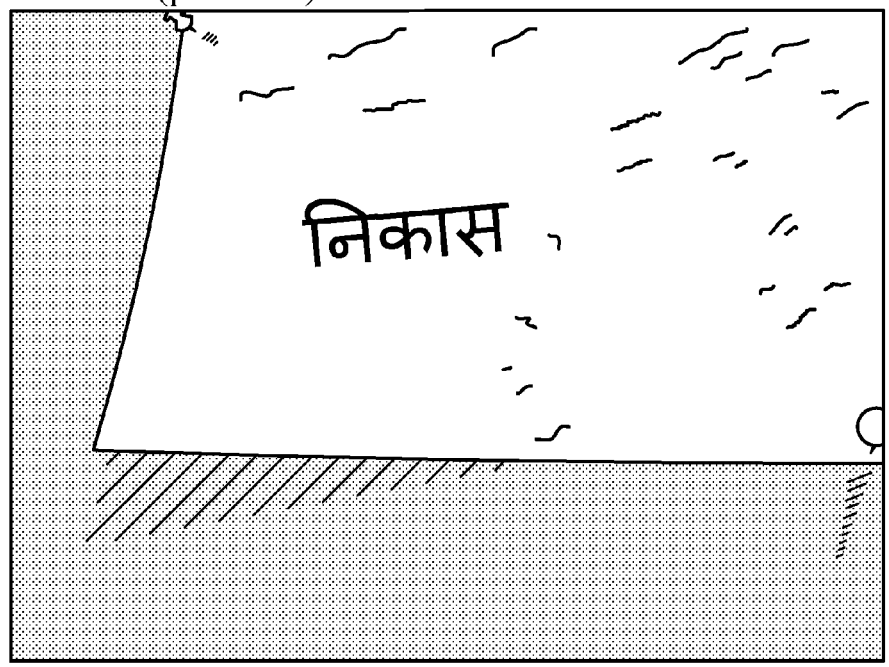
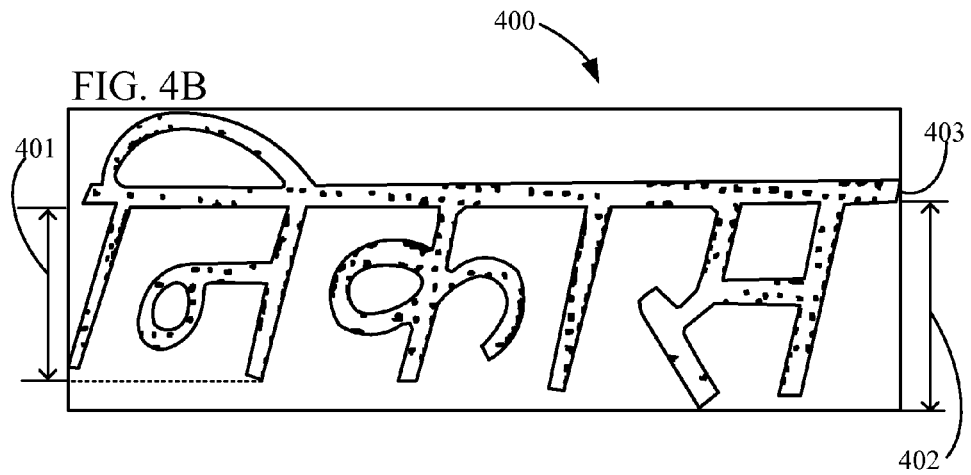
FIG. 4B

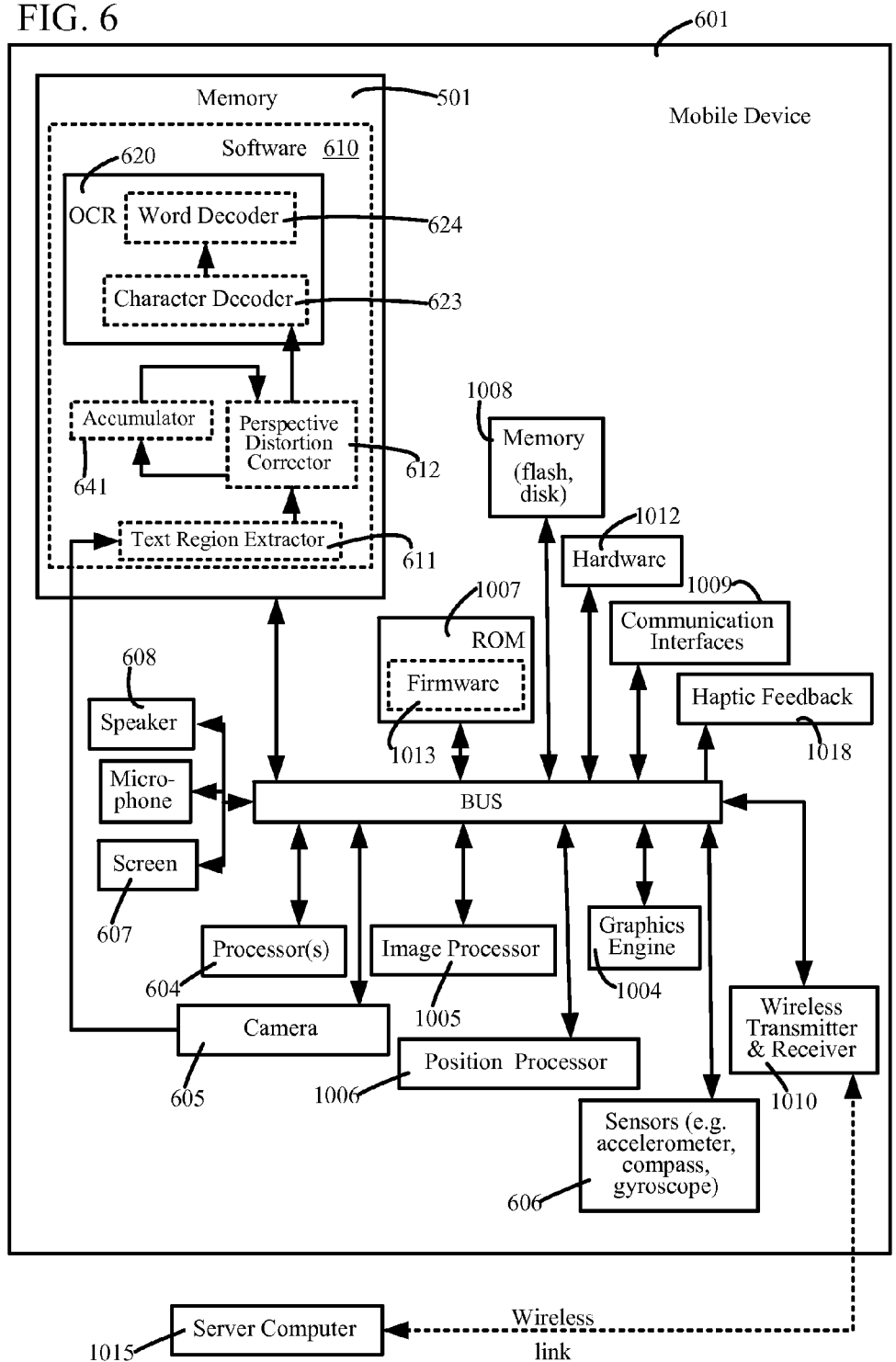

METHOD OF PERSPECTIVE CORRECTION FOR DEVANAGARI TEXT

CROSS-REFERENCE TO PROVISIONAL APPLICATION

This application claims priority to Indian Provisional Patent Application No. 5186/CHE/2012 filed in the Indian Patent Office on 12 Dec. 2012, and entitled "METHOD OF PERSPECTIVE CORRECTION FOR DEVANAGARI TEXT", which is incorporated herein by reference in its entirety.

CROSS-REFERENCE TO US APPLICATIONS INCORPORATED BY REFERENCE

This application is related to U.S. application Ser. No. 13/748,562, filed Jan. 23, 2013, entitled "Detecting and Correcting Skew In Regions Of Text In Natural Images" which is assigned to the assignee hereof and which is incorporated herein by reference in its entirety.

This application is related to U.S. application Ser. No. 13/831,237, filed Mar. 14, 2013, entitled "Automatic correction of skew in natural images and video" which is assigned to the assignee hereof and which is incorporated herein by reference in its entirety.

FIELD

This patent application relates to devices and methods for identifying in natural images or video frames, characters of text.

BACKGROUND

Identification of text regions in papers that are optically scanned (e.g. by a flatbed scanner of a photocopier) is significantly easier (e.g. due to upright orientation, large size and slow speed) than detecting regions that may contain text in scenes of the real world that may be captured in images (also called "natural images") or in video frames in real time by a handheld device (such as a smartphone) having a built-in digital camera. Specifically, optical character recognition (OCR) methods of the prior art originate in the field of document processing, wherein the document image contains a series of lines of text (e.g. 30 lines of text) of an optically scanned page in a document. Several such methods are described in an article by L. Jagannathan and C. V. Jawahar, in an article "Perspective Correction Methods for Camera-Based Document Analysis", Proceedings of First International Workshop on Camera Based Document Analysis and Recognition, August 2005, Seoul, Korea. pp 148-154 which is incorporated by reference herein as background.

Techniques of the type described above typically generate too many false positives and/or negatives so as to be impractical when used on natural images containing natural features (such as branches of a tree) mixed with text in various fonts e.g. on traffic signs, store fronts, vehicle license plates, due to variations in lighting, color, tilt, focus, font, etc. FIG. 1 illustrates a bill board 100 in a real world scene in India. A user 110 (see FIG. 1) may use a camera-equipped mobile device (such as a cellular phone) 108 to capture an image 107 (also called "natural image" or "real world image") of the bill board 100. Camera captured image 107 may be displayed on a screen 106 of the mobile device 108. Such an image 107 (FIG. 1), if processed directly using prior art image processing techniques of the type described in the previous paragraph may result in failure to recognize one or more words in a text region 103 (FIG. 1).

Specifically, use of prior art techniques cause problems in OCR processing a photograph of a scene wherein the bill board 100 is at a higher elevation than user 110, causing perspective distortion in image 107, unless the perspective distortion is corrected e.g. as described in the above-identified article by L. Jagannathan and C. V. Jawahar.

However, prior art methods of the type described above can be too slow and inaccurate for use on real world images with natural features and text (which may or may not be enclosed within a rectangular boundary). Hence, there is a need to perform perspective correction on a natural image or video frame, as described below.

SUMMARY

In several aspects of described embodiments, an electronic device and method perform perspective correction within a natural image or video frame, in each region identified as being likely to be text. Specifically, after obtaining an image from a camera, the electronic device and method extract from the image, one or more regions of text (also called "potential text regions" or simply "text regions"). Each text region received from extraction is includes a word of text with a longitudinal dimension oriented in a predetermined direction. For example, in embodiments wherein the words are written in the script Devanagari, a first line (e.g. shiro-rekha) is oriented e.g. horizontally. The electronic device and method detect a plurality of second lines that satisfy a predetermined test (e.g. oriented relative to the vertical axis within a predetermined range −max_theta to +max_theta), and that pass through a strip of the word located below the first line. The electronic device and method thereafter determine a single angle θ, based on individual angles between the plurality of second lines and a common direction (e.g. vertical).

Thereafter, the angle θ is used to perform perspective correction by warping the text region, e.g. changing first coordinates (e.g. x coordinates) of multiple pixels in one or more characters in the horizontally-oriented word in the text region, followed by storing changed coordinates in memory. After perspective correction, each text region is processed further, to recognize text therein e.g. by performing OCR on each sub-block among a sequence of sub-blocks sliced from a block of the text region. Thereafter, the result of text recognition is stored in memory, and used to display to the user, either the recognized text or any other information obtained by use of the recognized text.

In some embodiments, the just-described sequence of steps are performed repeatedly, once for each region identified as being likely to be text. In illustrative embodiments, each potential text region may be identified via MSER region extraction, followed by skew correction of MSER regions, followed by shiro-rekha detection in the skew-corrected regions, followed by application of clustering rules to merge shiro-rekha regions with adjacent regions whose projections on an axis (e.g. x-axis) overlap. Then, in the illustrative embodiments, the regions known to contain shiro-rekha (and merged with adjacent regions, if any) are fed through a verification subsystem (e.g. based on neural networks and/or stroke width), to obtain a number of potential text regions. Each such potential text region is then individually subject to perspective distortion detection and correction in several embodiments of the type described herein. Therefore, in such embodiments, skew correction is done before perspective correction, thereby to require only warping of the x-coordinate, for correcting perspective distortion (if any), in each potential text region obtained as described in this paragraph.

Therefore, instead of performing perspective correction on an entire image that is received from a camera, several embodiments perform perspective correction selectively, only on individual regions that are identified as being likely to be text, thereby to reduce the amount of computation (instead of performing perspective correction on the entire image). Moreover, in several embodiments of the type described above, an angle θ that is used to perform perspective correction of one text region in the image is specifically computed for that text region and therefore different from another angle θ' used to perform perspective correction of another text region in the same image. Hence, such embodiments localize and customize the perspective correction for each text region in an image captured by a handheld camera (instead of performing perspective correction at a common angle θ across the entire image).

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 3A and 3B illustrate, in intermediate-level flow charts, acts performed by one or more processor(s) 604 in some embodiments of the type illustrated in FIG. 2.

FIG. 3C illustrates a strip 302 of a region 300 that is extracted as per act 219 in FIG. 3A and used to identify lines that are nearly vertical as per act 221 in FIG. 3A.

FIG. 4A illustrates a prior art image of real world.

FIG. 4B illustrates a text region 400 with shiro-rekha 403 horizontal, as extracted from the image of FIG. 4A in some embodiments, by performing operation 210 (FIG. 2).

FIG. 6 illustrates, in a high-level block diagram, various components of a mobile device in some of the described embodiments.

DETAILED DESCRIPTION

Several operations and acts of the type described herein are implemented by one or more processor(s) 604 included in a mobile device 601 (FIG. 6) or other such apparatus that is capable of identifying rectangular portions (also called "blocks") of an image of a real world scene, (e.g. scene of bill board 100) followed by segmentation of each rectangular portion to form sub-blocks and identify characters therein. Hence, mobile device 601 may include a camera 605 (FIG. 6) to generate an image or frames of a video of a scene in the real world. Mobile device 601 may further include sensors, such as accelerometers, gyroscopes, GPS sensor or the like, which may be used to assist in determining the pose (including position and orientation) of mobile device 601 relative to a real world scene.

Those of skill in the art will appreciate that the techniques described herein can be adapted to identify portions of an image having a shape other than a rectangle, and to identify characters therein. While various examples described herein use Devanagari to illustrate certain concepts, those of skill in the art will appreciate that these concepts may be applied to languages or scripts other than Devanagari. For example, embodiments described herein may be used to identify characters in Korean, Chinese, Japanese, and/or other languages. Moreover, note that in the following description, a single processor(s) 604 is occasionally described for convenience, although it is to be understood that multiple processors may be used depending on the embodiment.

Figure 2:
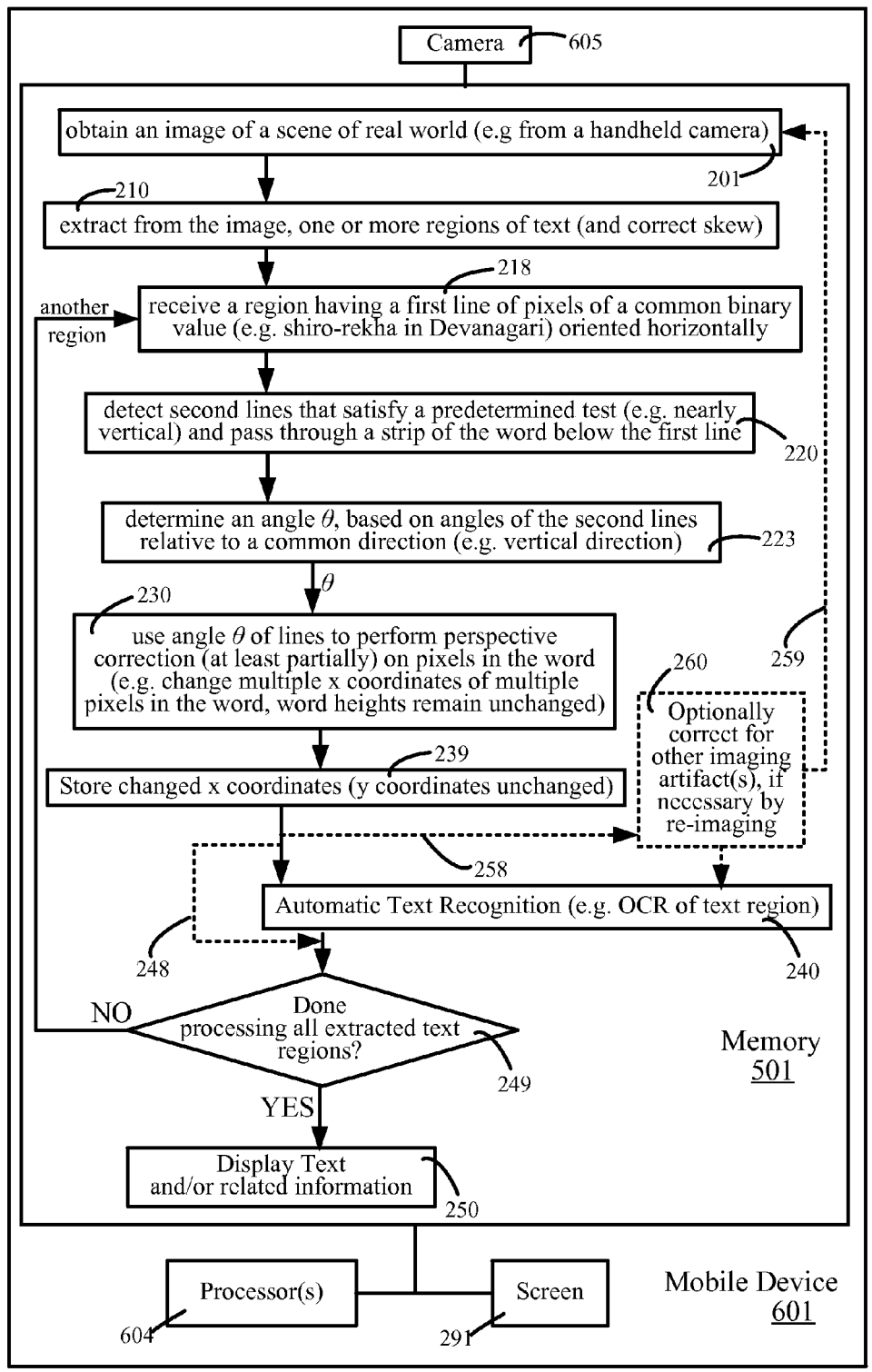
FIG. 2 illustrates, in a high-level flow chart, acts performed by at least one processor in several described embodiments, to extract one or more regions likely to be text from an image, identify lines that are nearly vertical in each region, and use an angle of the lines to perform perspective correction in each region.

Accordingly, as per act 201 in FIG. 2, one or more processor(s) 604 typically obtain (e.g. from camera 605, see FIG. 6) an image of a scene of real world. Thereafter, processor(s) 604 identify one or more regions that are likely to contain text (also called "potential text regions" or simply "text regions"), as illustrated by operation 210 in FIG. 2. In illustrative embodiments, each potential text region may be identified in operation 210 via MSER region extraction, followed by skew correction of a plurality of regions of text (including one or more text regions), followed by shiro-rekha detection in the skew-corrected regions.

Detection of a shiro-rekha is followed in some embodiments by application of clustering rules to merge shiro-rekha regions with adjacent regions whose projections on an axis (e.g. x-axis) overlap. Depending on the embodiment, use of clustering rules to merge shiro-rekha regions with adjacent regions may be done either before or after detection and correction of perspective distortion as described below. In illustrative embodiments, one or more regions known to contain a line of pixels of a common binary value, satisfying a test for identification of shiro-rekha (and merged with adjacent regions, if any) are fed through a verification subsystem (e.g. based on neural networks and/or stroke width), to obtain a number of potential text regions. Each such potential text region is then stored in memory 501 for use in perspective correction as described herein.

In some embodiments, skew correction (by rotation of an image as a whole or by rotation of the plurality of regions of the image through a common angle −φ wherein φ denotes skew) is done in the operation 210 (described above), before perspective correction. In such embodiments, skew may be corrected in operation 210 by performing one or more acts of the type described in U.S. application Ser. No. 13/748,562, and/or U.S. application Ser. No. 13/831,237 incorporated by reference above.

Accordingly, one or more text regions (identified by list(s) of pixels) obtained by performance of operation 210 are received (from memory 501) in act 218 and each region (identified by a corresponding list of pixels indicative of text) is already skew corrected, and thereafter individually subject to perspective distortion detection and correction in several embodiments of the type described herein. Several such embodiments change only the x-coordinate (also called "first" coordinate) e.g. by warping to correct perspective distortion (if any), of each pixel in a list for each text region, received from memory 501, without necessarily changing the y-coordinate (also called "second" coordinate).

Specifically, after operation 210, in act 218, processor(s) 604 receive a list of coordinates of pixels representing a text region (also called "selected" text region or "selected" region) which is already skew-corrected, but has some perspective distortion (e.g. a first height 401 at the left end (also called "first end") of a word in text region 400 may be smaller than a second height 402 at the right end (also called "second end") of the word in text region 400, as illustrated in FIG. 4B). Accordingly, in operation 220 processor(s) 604 of such embodiments executes first instructions included in software 610 (see FIG. 6) to receive (as per act 218 described above), a region of text in an image of a scene of real world captured by a camera (which implements means for receiving). Processor(s) 604 when programmed with second instructions included in software 610, process in operation 220 the text region that has been received (which implements means for detecting), to detect lines (also called "second" lines) that pass through a strip in the word located below another line (also called "first" line) and that additionally satisfy a predetermined test, specifically being oriented relative to a common direction, such as vertical at least within a specified range (e.g. lines that are nearly vertical).

Subsequently, in act 223, processor(s) 604 of certain embodiments execute third instructions included in software 610 to determine a single angle θ (which implements means for determining), based on several angles between the several identified lines and a predetermined direction (e.g. vertical). Thereafter, in operation 230, processor(s) 604 of some embodiments execute fourth instructions included in software 610 to use the angle θ which was determined based on the identified lines (which implements means for using), to perform perspective correction on the selected text region. Depending on the embodiment, the perspective correction may be performed partially, e.g. only on x coordinates of multiple pixels in at least one character in the text region, or completely in both x and y coordinates of the text region. In embodiments that do not change the y coordinates in operation 230, the above-described two heights (at the left end and at the right end) of the word do not change. In act 239, processor(s) 604 execute fifth instructions included in software 610 to store at least changed first coordinates (and optionally store the unchanged second coordinates) of multiple pixels in memory 501 (which implements means for storing).

After the partial or complete perspective correction, and storage to memory 501, processor(s) 604 may subject the list of pixels (now with changed coordinates) of a text region to automatic text recognition in an operation 240 in the normal manner. For example, in operation 240, processor(s) 604 may perform OCR of a word (also called "first word") in the text region (e.g. by slicing a block of the selected text region into a sequence of sub-blocks, followed by each sub-block being recognized as a character). In some embodiments, as shown by branch 258 in FIG. 2, an optional operation 260 may be performed after operation 230 and before operation 240, e.g. to correct for any other imaging artifacts that may be present in the text region (and in some embodiments, the text region may be re-imaged as shown by branch 259 returning to act 201, e.g. by zooming in if the height is insufficient for input to OCR to be performed in operation 230).

After characters are recognized in a text region, processor(s) 604 may check in act 249 whether or not all text regions extracted from an image have been processed in the above described manner (e.g. operations 230 and 240), and if not return to act 218 to select another text region to be perspective corrected followed by text recognition. Hence, operations 220, 230 and 240 may be performed iteratively in a loop shown in FIG. 2. Therefore, in many embodiments, a list of coordinates of pixels in a first text region is perspective corrected and recognized (OCR processed) in an iteration of the loop, independent of any other text region which is similarly processed in another iteration of the loop.

Specifically, in an image having multiple text regions, a first region may be processed by processor(s) 604 to identify a first angle θ1 as described above, followed by perspective correction by processor(s) 604 changing x coordinates of pixels in the first region using angle θ1 and a second region is processed by processor(s) 604 to identify a second angle θ2 also as described above, followed by perspective correction by processor(s) 604 changing x coordinates of pixels of the second region, by using angle θ2.

In some embodiments, when all text regions have been processed for text recognition, the yes branch may be taken in act 249 to enter operation 250. In operation 250, processor(s) 604 may display the result of automatic recognition of text of an image in operation 240 and/or other related information that may be obtained by use of the recognized text (e.g. a translation of the recognized text into another language).

Note that although in some embodiments of the type described above, operation 240 to automatically recognize text in an image captured by a handheld camera is performed before act 249, in other embodiments the branch 248 may be taken from operation 230 to act 249, so that lists of pixels in all text regions are processed for correction of perspective distortion, followed by an iterative loop of automatic recognition of text in operation 240 of all perspective corrected regions.

Figure 1:
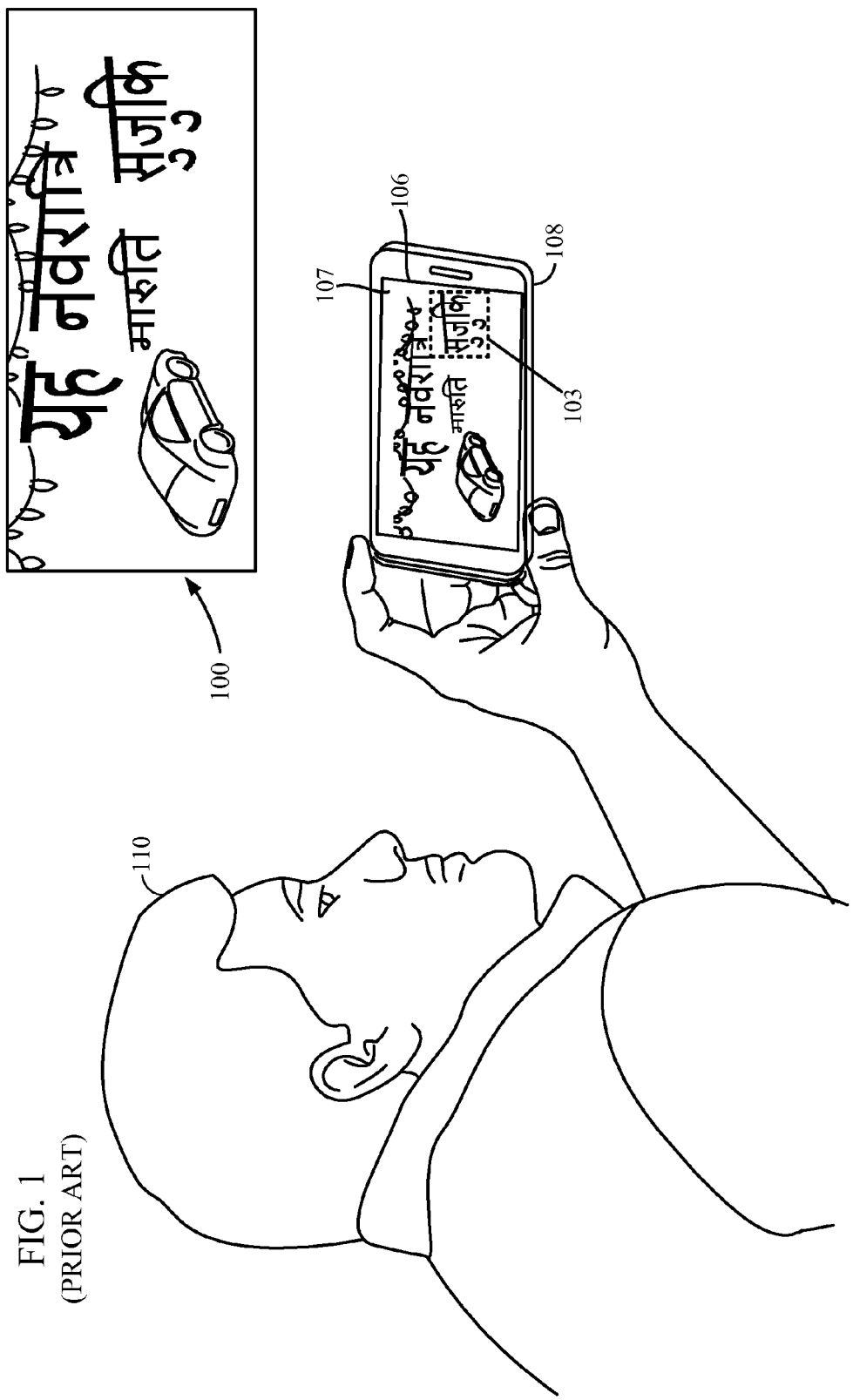
FIG. 1 illustrates a user using a camera-equipped mobile device of the prior art to capture an image of a bill-board in the real world.
Figure 3A:
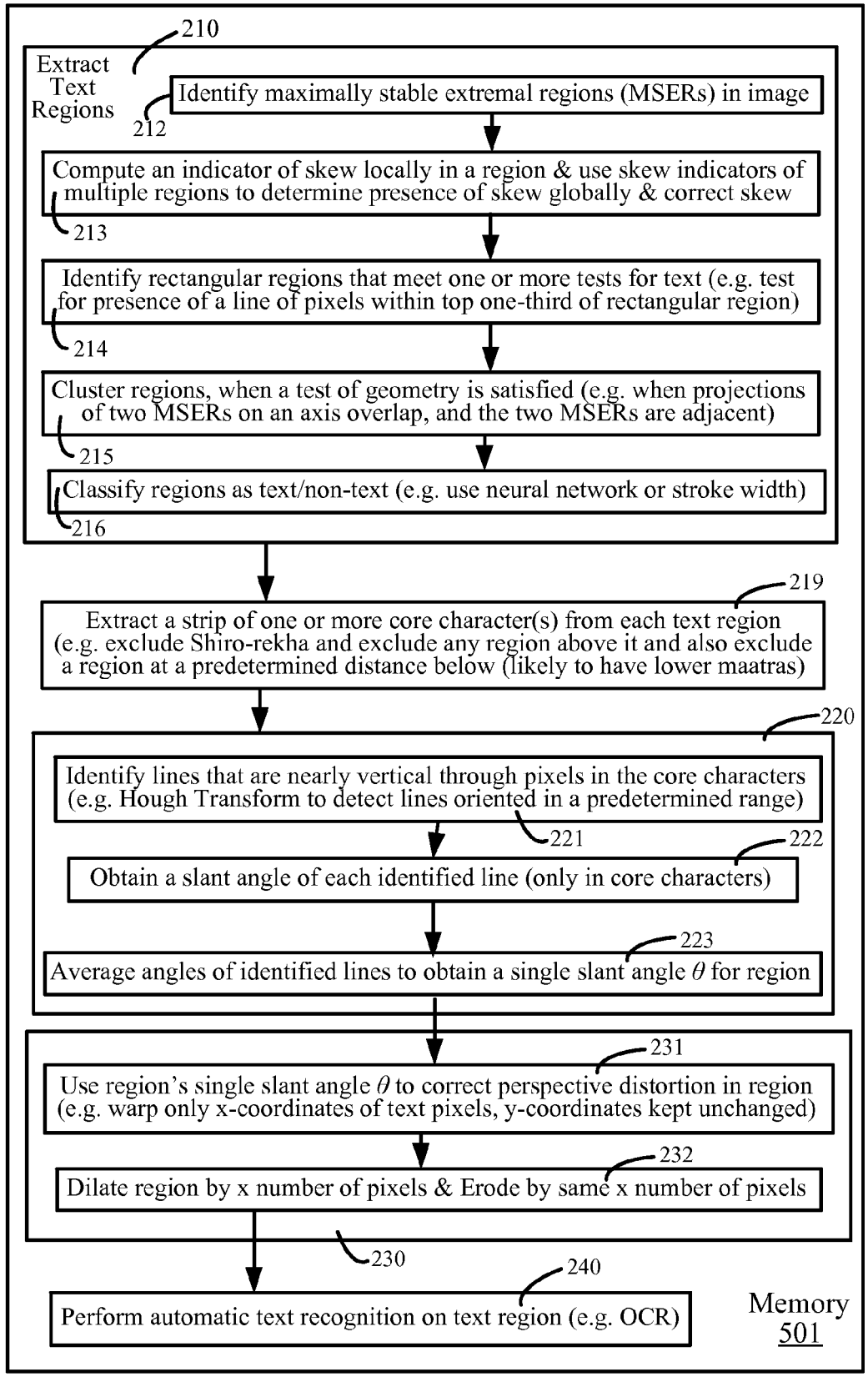

One or more processor(s) 604 in some embodiments may be programmed to perform a number of acts or steps of the type illustrated in FIG. 3A as follows. Specifically, operation 210 (FIG. 2) may be implemented by performing the acts 212-216 as follows. In act 212, a portion of an image (such as image 107 in FIG. 1) may be identified by such a processor(s) 604 using any method that identifies from image 107, one or more regions (also called "blobs") that differ from surrounding pixels in one or more properties, such as intensity and/or color. Regions of the type described above may be similar or identical to regions known in the prior art as connected components, and/or maximally stable extremal regions or MSERs.

The regions are normally identified as rectangular portions, by processor(s) 604 identifying a bounding box that tightly fits a region identified by use of any known method that identifies MSERs or identifies connected components in an image. A tight fitting bounding box can be identified by processor(s) 604 in the normal manner, using maximum and minimum coordinates of such a region. The bounding box may be then used by processor(s) 604 to compute an indicator of skew locally within the region, as per act 213, e.g. as a ratio of (a) an area of the rectangle and (b) a count of pixels in the region that have a specific binary value (e.g. all pixels of 0 value).

One or more such skew indicator(s) of corresponding MSER regions may be used by processor(s) 604 (in act 213), to determine the presence of an angle φ of skew globally in image 107 (see FIG. 1) in its entirety, followed by correction of the skew (if present), e.g. either automatically or manually depending on the embodiment. Hence, in some embodiments, an image as a whole is rotated through angle –φ when the detected skew is angle φ, while in other embodiments, all the text regions are rotated through the common angle –φ.

After skew correction, some embodiments identify one or more rectangular regions that are likely to be text in an act 214, by applying one or more tests that determine presence of text in an image. For example, processor(s) 604 may check for presence of a line of pixels within a top one-third of the rectangular region, in act 214 (which may indicate presence of a shiro-rekha in Devanagari text). Hence, in some embodiments, act 214 may check for presence in the top one-third, of a peak in a histogram of pixel intensities, e.g. by identifying a row that contains a maximum number of pixels binarized to value 1, across all rows of the rectangular region.

After act 214, some embodiments perform an act 215 wherein two or more regions may be clustered by processor(s) 604, based on a test of geometry (e.g. when projections of two regions on an axis (such as the x-axis) overlap and the two regions are adjacent to one another with no other region intervening there-between). The just-described clustering enables various modifiers (e.g. upper maatras and/or lower maatras) to be included with the specific characters that are modified by the modifiers (e.g. by being appending thereto).

Figure 3D:
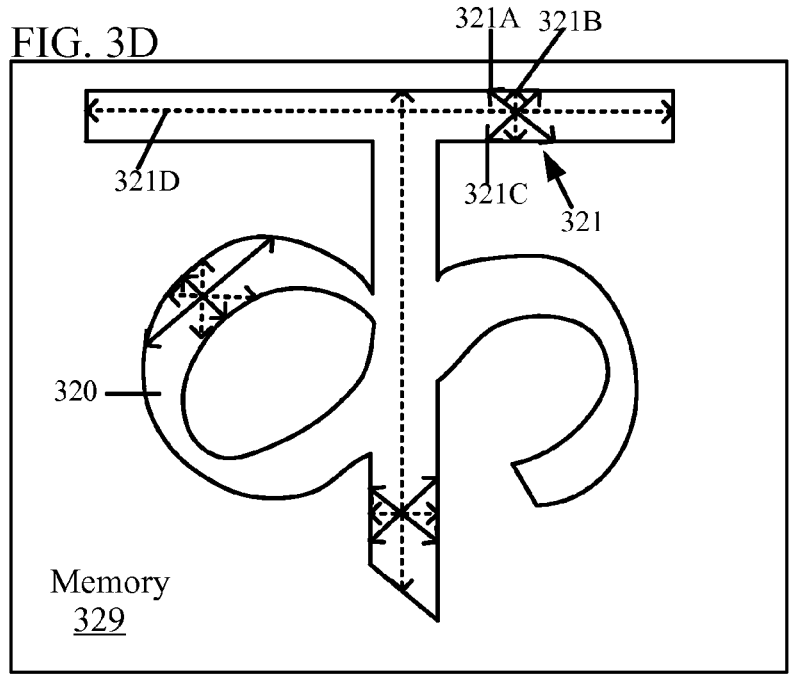
FIG. 3D illustrates a region of an image wherein stroke width is computed as shown in FIG. 3E.
Figure 3E:
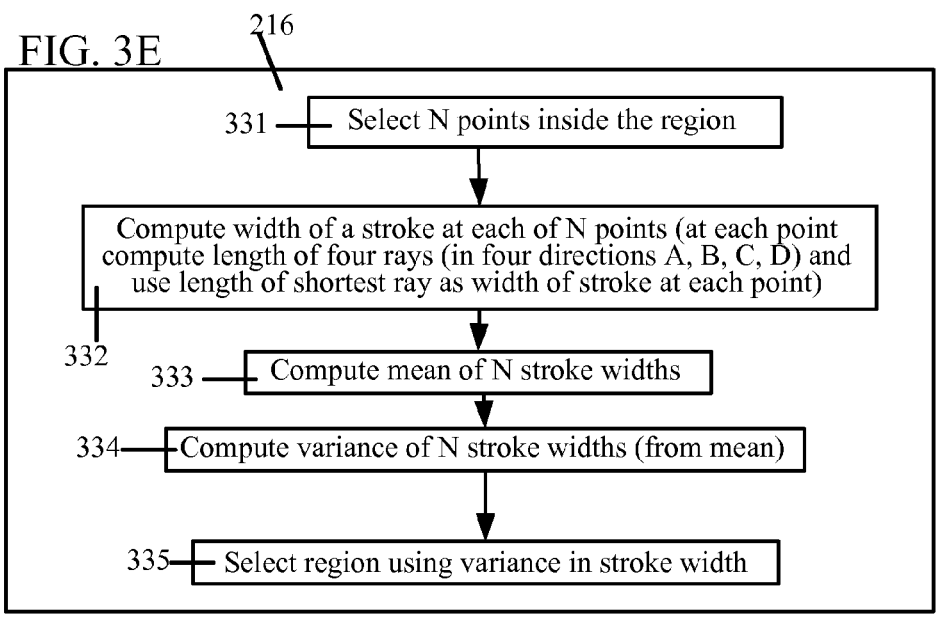
FIG. 3E illustrates, in an intermediate-level flow chart, various acts performed by a mobile device to compute width of a region's portion assuming the portion is a stroke in certain described embodiments.
Figure 5A:
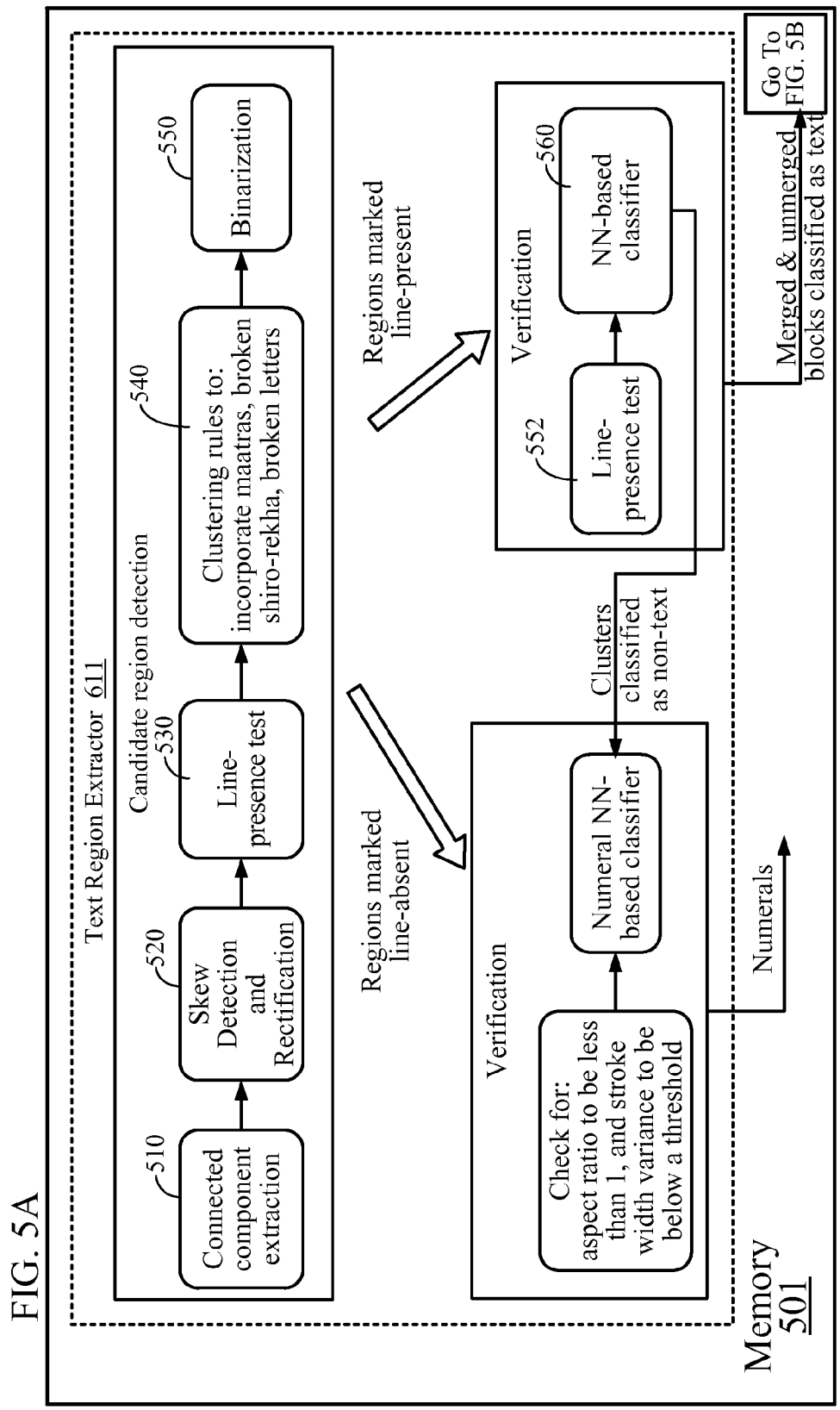
FIG. 5A illustrates, in a high level block diagram, a text region extractor that performs operation 210 of FIG. 2.

Thereafter, processor(s) 604 perform an act 216 to classify the regions (whether or not merged) as text or non-text, e.g. by use of a neural network and/or based on stroke width, which may be implemented in a verification subsystem of the type illustrated in FIG. 5A. In some embodiments, a region is classified in act 216 as text based at least partially on variance of stroke width in the region being below a threshold, as illustrated in FIGS. 3D and 3E and described next. In some illustrative embodiments, processor(s) 604 perform acts 331-334 (FIG. 3E) to implement a test in the operation 216. Specifically, in act 331, processor(s) 604 selects N points inside a region 320 (FIG. 3B), such as the point 321. Next, in act 332 processor(s) 604 compute width of a stroke at each of the N points. For example, at point 321, processor(s) 604 compute the length of four rays 321A, 321B, 321C, and 321D (FIG. 3D) and then use the length of ray 321B (FIG. 3D) which is shortest (among the four rays) as width of the stroke at point 321. Then, in act 333, processor(s) 604 compute the mean of N such stroke widths for the region 320. Finally, in act 334, processor(s) 604 compute standard deviation and/or variance of the N stroke widths (from the mean). Then as noted above, an act 335 is performed to check if the variance is less than a predetermined threshold, and if so the region is identified as being text (or likely to contain text).

Each region that is classified as text (also called "text region" or "text cluster") is then individually supplied to operation 220 (described above), in some embodiments after an operation 219 to extract a strip of core characters (e.g. see strip 302 in FIG. 3C). In some embodiments, the strip has a predetermined relationship to a first line, e.g. the strip is located below pixels of a common binary value arranged along a line ("first" line) that form a header line (called shiro-rekha) in a character. After skew correction (e.g. by rotation through a common angle –φ), the header line is oriented along a longitudinal direction of the text region (or perpendicular to a predetermined direction, described below). As noted above, in the script Devanagari, a horizontal line of pixels (called shiro-rekha) may be present in a character in the text region, so a strip below this line of pixels (also called "additional line of pixels") is extracted in certain embodiments of operation 219.

For example, some embodiments perform operation 219 by excluding (1) a horizontal line of pixels that forms the shiro-rekha 304 (FIG. 3C), (2) a top strip 301 located immediately above shiro-rekha 304 (as likely to have upper maatras 307A, 307B), and (3) a bottom strip 303 located below a character 309 (as likely to have a lower maatra 306), thereby to obtain a list of pixels in a strip 302 of height 305 (as likely to have core characters). Depending on the embodiment, bottom strip 303 may be identified as being located at a predetermined fraction of height 308 of text region 300 (FIG. 3C) and/or based on sparseness of pixels in bottom strip 303 relative to pixels in strip 302.

Hence, a list of pixels in a strip 302 of core characters (see FIG. 3C) obtained from operation 219 is used in operation 220 of some embodiments of processor(s) 604 to perform acts 221, 222 and 223 (see FIG. 3A) as follows. Specifically, in act 221 (FIG. 3A), several lines that are nearly vertical (or nearly perpendicular to a direction of shiro-rekha described above), and pass through pixels in the strip of core characters in a specific text region (obtained from operation 219) are identified automatically by processor(s) 604. For example, act 221 may be implemented by programming processor(s) 604 with software, to apply a Hough Transform to pixels in the core character strip, to identify lines that (1) satisfy a predetermined test, e.g. oriented in a predetermined range –max_theta to +max_theta around the vertical, and (2) pass through pixels of characters in the strip. In one illustrative example, max_theta is selected to be 20° although any other angle may be used as will be readily apparent in view of this disclosure.

A Hough Transform may be implemented by processor(s) 604 in any manner of the type that would be readily apparent to the skilled artisan in view of this description. For example, in some embodiments, processor(s) 604 may be programmed with software of the type described in an article by Richard O. Duda and Peter E. Hart, entitled "USE OF THE HOUGH TRANSFORMATION TO DETECT LINES AND CURVES IN PICTURES" published in the Communications of ACM, vol. 15, no. 1, pp 11-15 (January 1972), available at http://www.ai.sri.com/pubs/files/tn036-duda71.pdf which is incorporated by reference herein in its entirety.

In some embodiments, processor(s) 604 may be configured to apply a Hough Transform to pixels in a core character strip as described above, to identify lines passing through pixels of text (also called "text pixels"), by performing the following five steps. In a first act, processor(s) 604 receive co-ordinates (x,y) of a pixel of text, located in the core character strip. Specifically, in the core character strip, each pixel has a common binary value of, for example, zero (or black) as the intensity when the pixel is text and another binary value of, for example, 1 (or white) as the intensity of each pixel that is not a text pixel. In a second act, processor(s) 604 evaluate $r=x*\cos(\theta)+y*\sin(\theta)$, for theta in the range (–max_theta to +max_theta). Then, also in the second act, processor(s) 604 increment a count corresponding to the (r, theta) bin in memory 501 (also called "Hough accumulator"), e.g. accumulator 614 in FIG. 6. Thereafter, in a third act, processor(s) 604 returns to the first act (described above), thereby to repeat the first act and the second act in a loop, for all pixels that are text pixels in the image (e.g. all pixels that are black in the image).

When all text pixels of a core character strip have been processed as described above in reference to the first, second and third act, processor(s) 604 go to the fourth act, to determine one or more local maxima in the Hough accumulator, e.g. accumulator 614 in FIG. 6. Thereafter, in a fifth act, processor(s) 604 mark in memory 610 all the local maxima that were identified in the fourth act, e.g. in the form of (r, theta) bins, which are thereby identified (and marked in memory 501) as lines satisfying the specified criteria (namely within the predetermined range −max_theta to +max_theta around the vertical, and passing through pixels of text in the core character strip).

In some embodiments, each identified line represents multiple points (e.g. in the slope-intercept space used by Hough Transform) which are at least N in number, wherein N is a "threshold" number (e.g. 3 one-pixel wide lines), for a line to be "identified" by the Hough Transform as being present in pixels of the core character strip of a specific text region. In several embodiments, the value of "threshold" is determined empirically, by trial and error. Each line identified in act 221 of such embodiments represents a "bundle" of lines passing through the core character strip identified by operation 219, which may be at slopes similar to one another (e.g. within a predetermined range), and which may be at locations adjacent to one another (e.g. within a width of a stroke or glyph of a character).

Figure 4C:
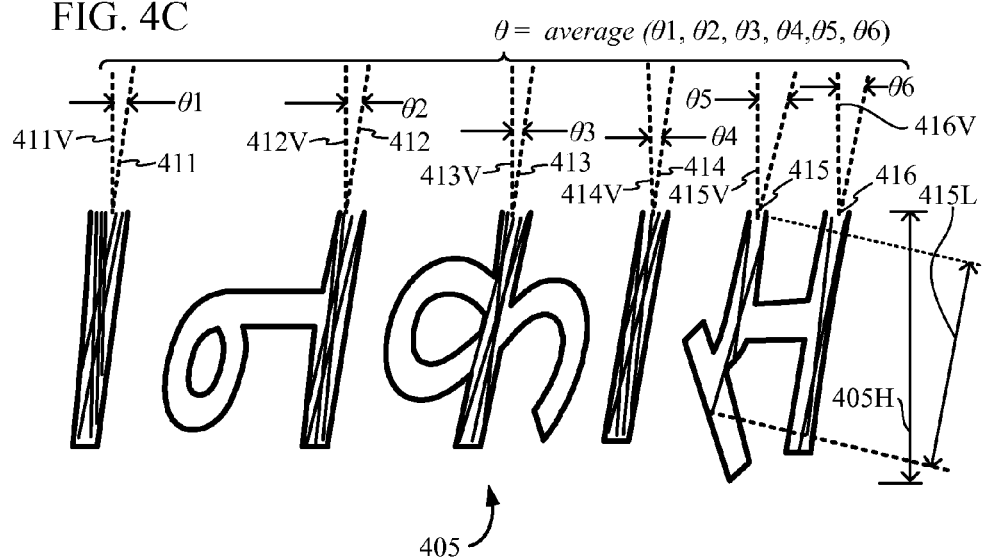
FIG. 4C illustrates nearly-vertical lines 411-416 that are automatically identified in a core character strip 410 of the text region 400 of FIG. 4B in some embodiments, by performing operation 220 (FIG. 2).

Next, in act 222, the slant angle of each identified line (in the core character strip) relative to vertical is obtained by processor(s) 604, e.g. from an accumulator (see accumulator 641 in FIG. 6) of the Hough Transform, followed by act 223. Subsequently, in act 223, the just-described slant angles of the identified lines are averaged by processor(s) 604 to obtain a single slant angle θ for the core character strip (and hence also for the specific text region from which the core character strip was extracted). For example, as illustrated in FIG. 4C, a plurality of lines 411, 412, 413, 414, 415 and 416 are identified by processor(s) 604 applying the Hough Transform to a second list of pixels in the core character strip 405 extracted from a first list of pixels in the text region 400, see FIG. 4B. In this example, the first list of pixels in text region 400 is itself extracted from an image of real world captured by a camera as illustrated in FIG. 4A.

Each of lines 411, 412, 413, 414, 415 and 416 is identified by application of the Hough Transform, as passing through straight line segments formed by pixels in a core character strip 405 (FIG. 4C) which are indicative of at least one character (without shiro-rekha, and without upper and lower maatras), in a sequence of characters that may form a word in text region 400 (FIG. 4B). Each of lines 411, 412, 413, 414, 415, 416 may bundle the contribution of multiple line segments (formed by pixels of text in core character strip 405) that are adjacent to one another and are normally one pixel wide. An accumulator 641 used in the Hough Transform may be looked up by processor(s) 604 to obtain the slope of lines 411, 412, 413, 414, 415, and 416 to the respective verticals 411V, 412V, 413V, 414V, 415V, 416V thereby to identify a plurality of angles θ1, θ2, θ3, θ4, θ5, and θ6.

In the example of FIG. 4C, the plurality of angles θ1, θ2, θ3, θ4, θ5, and θ6 respectively of the lines 411, 412, 413, 414, 415 and 416 are averaged (e.g. by summing up and dividing by 6, although other embodiments may combine them differently), to obtain the slant angle θ for the core character strip 405. In some embodiments, prior to averaging to obtain slant angle θ the length of each line segment of pixels in core character strip 405 through which lines 411, 412, 413, 414, 415 and 416 pass is checked to ensure a predetermined test is satisfied, e.g. the line segment is longer than a predetermined fraction (e.g. 0.8) of the height 405H of core character strip 405 (also called simply "core" strip). Hence, length 415L of a line segment formed by pixels in the left portion of character स in FIG. 4C through which line 415 (FIG. 4C) passes is compared with 0.8× height of core character strip 405 (e.g. height 405H). In this example length 415L is greater, hence the predetermined test is satisfied and angle θ5 is included in the averaging, to obtain slant angle θ (and in situations when this test is not satisfied, angle θ5 is excluded from averaging).

In some embodiments of act 223, the slant angle θi of an identified line i is used by processor(s) 604 in averaging only when the identified line i which is identified by application of the Hough Transform satisfies an additional predetermined test. In the additional predetermined test, processor(s) 604 determine the length of an identified line i (e.g. within a list of pixels identified as text) and select the identified line's slant angle θi for use in averaging to compute angle θ when its length Li is larger than a predetermined fraction (e.g. 0.9) of a dimension of the core character strip (e.g. strip 302) in the predetermined direction (e.g. height 305 in FIG. 3C).

Operation 220 outputs angle θ of a specific text region to another operation 230 that performs perspective correction in pixels of that specific text region, by processor(s) 604 performing the acts 231 and 232 as follows. Specifically, in act 231, processor(s) 604 of some embodiments use slant angle θ of the specific text region to correct perspective distortion in pixels of the region only partially, by warping the x coordinates but not changing the y coordinates followed by act 239 of storing them in memory 501. Note that while some embodiments do not change y coordinates, other embodiments may change y coordinates (in addition to changing x coordinates) in operation 230 (using an appropriate transform for each coordinate), thereby to store in act 239 the changed x coordinates and changed y coordinates (of pixels in a text region to be subject to OCR). Storing of y coordinates unchanged with changed x coordinates, in certain embodiments as per act 239 may cause a perspective corrected text region to continue to have some characters elongated relative to other characters, e.g. due to a similar relationship therebetween caused by perspective distortion (prior to correction).

For example, the last character स towards the very right (i.e. at the end) of a perspective distorted word (i.e. sequence of characters) in text region 400 of FIG. 4B has a last height 402 that makes it taller than the first character न towards the very left (i.e. at the beginning of the sequence) which has a first height 401. The difference in first height 401 and last height 402 is caused by perspective distortion in the image (FIG. 4A), on being captured at a non-normal angle by camera 605 (FIG. 6). However, such a difference in heights of characters has negligible or no effect on the accuracy of text recognition, to be performed by some embodiments of operation 240.

Figure 4D:
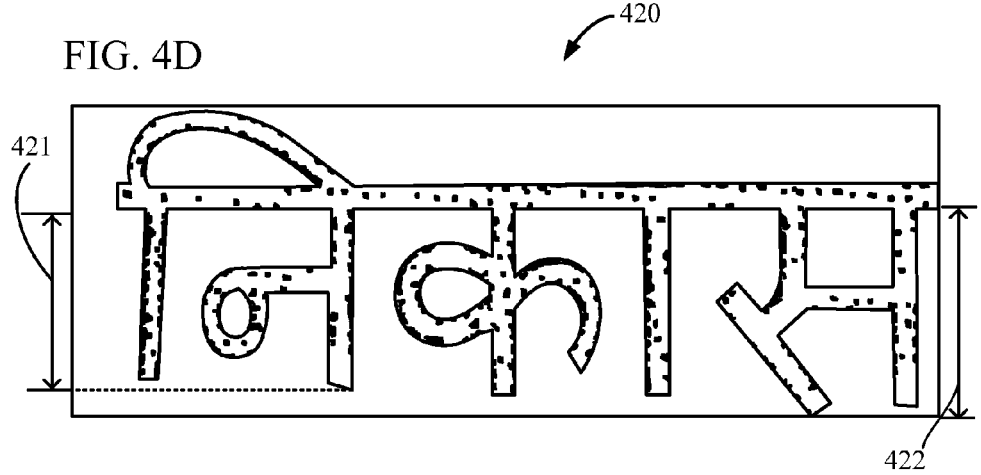
FIG. 4D illustrates the result of performing perspective correction on the text region 400 of FIG. 4B, by use of an angle θ that is determined as an average of respective angles θ1-θ6 at which (relative to vertical) are slanted lines 411-416 identified in operation 220 as shown in FIG. 4C.

Hence, in this example, no change is made to the y coordinates, so that the letter स towards the very right of a region 420 obtained after perspective correction (of a list of pixels) as shown in FIG. 4D (with height 422) remains taller than नि towards the very left (with height 421). In embodiments that make no changes to y coordinates in the list of pixels during perspective correction, heights 421 and 422 (FIG. 4D)

after correction may be identical to respective first height 401 and last height 402 (FIG. 4B) before correction.

Figure 4E:
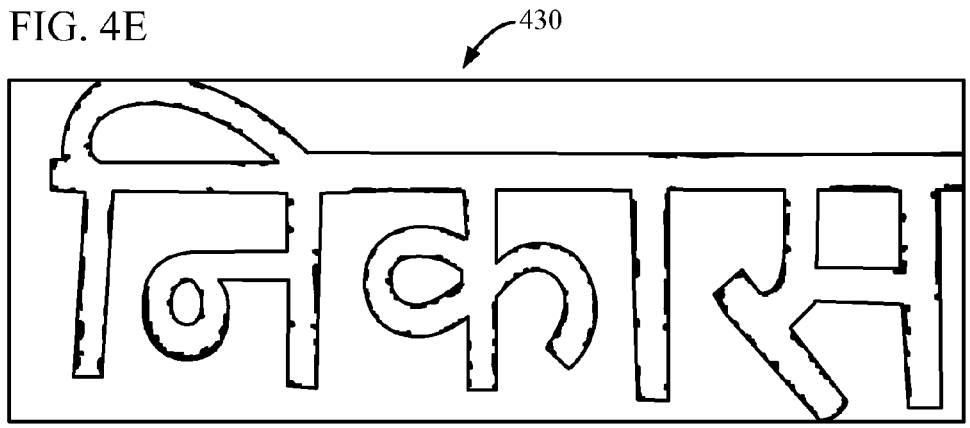
FIG. 4E illustrates a result of dilation (as per act 232 in FIG. 3A) of the perspective-corrected text region of FIG. 4D by 1 pixel in each direction.

In some embodiments, when slant angle θ is less than a predetermined minimum (e.g. less than 1°) no perspective correction is done in operation 230, because such a small angle of distortion has negligible or no effect on the accuracy of text recognition, to be performed by some embodiments of operation 240. After performance of act 231, a list of pixels for the region 420 (see FIG. 4D) obtained after perspective correction is dilated in an act 232 of some embodiments. Specifically, sixth instructions included in software 610 may be executed in act 232 by one or more processor(s) 604 to implement dilation, e.g. by appending to a list for region 420, one or more pixels at locations of transition from a pixel of text to a pixel of non-text (e.g. by adding 1 pixel to the list of pixels of text in region 420), to obtain a dilated region 430 (FIG. 4E).

Thus, a set of additional pixels are included in the list of pixels indicative of region 420, thereby to generate a dilated region 430. After dilation in act 232, a number of holes (e.g. at least a majority of holes) in region 420 (FIG. 4D) become filled by a set of additional pixels that are newly added to the list of pixels of text by act 232. However, dilation increases stroke width of characters indicated by pixels in dilated region 430. Accordingly, seventh instructions included in software 610 may be executed in act 232 by one or more processor(s) 604 to implement erosion, so as to reduce the width of each stroke in dilated region 430, e.g. by removing pixels (e.g. also 1 pixel) of text at locations of transition from each pixel of text to a pixel of non-text (e.g. by removing a pixel from the list of pixels of text in region 420). Specifically, the eroding in act 232 removes a subset from the set of additional pixels added by the dilating in act 232. A resulting list of pixels for text region 440 (see FIG. 4F) obtained by performing the act 232 (FIG. 3A) is then supplied to operation 240, described next.

After performance of operation 230, an operation 240 is performed in some embodiments, to recognize text in the perspective-corrected text region. At this stage, processor(s) 604 of several embodiments may obtain a sequence of sub-blocks from a block of a text region in any normal manner. For example, a text region identified as the list of pixels supplied by act 232 is subdivided (or sliced) in act 241 (see FIG. 3B) to identify one or more lists corresponding to one or more sub-blocks representing a single character of text. Sub-blocks may be sliced from a block of a text region using any known method e.g. based on height of the block, and a predetermined aspect ratio of characters and/or based on occurrence of spaces outside the boundary of pixels identified as forming an MSER region but within the block. The result of slicing in act 241 is a sequence of sub-blocks, and each list of pixels representing a character in a sub-block is subject to optical character recognition (OCR) as described below.

Specifically, in an act 242 (FIG. 3B), processor(s) 604 form a feature vector for each bock of the text region, followed by act 243 (see FIG. 3B). A specific feature vector that is formed in act 242 can be different, depending on the embodiment. In act 243, processor(s) 604 decode the feature vector, by comparison to corresponding feature vectors of letters of a predetermined alphabet, to identify one or more characters (e.g. alternative characters for each sub-block, with a probability of each character). Subsequently, in act 244 (see FIG. 3B), processor(s) 604 use one or more sequences of the identified characters with a repository of character sequences, to identify and store in memory (and/or display on a screen 607) a word (e.g. in the language Hindi) identified as being present in the text region that was subject to automatic recognition of text (e.g. OCR) in operation 240.

Accordingly, several embodiments of the type described above in reference to FIGS. 2, 3A and 3B provide perspective distortion correction for improving automatic recognition of text in camera captured images. Such perspective correction eliminates issues arising from a non-normal angle between the camera and the object being photographed (e.g. due to differences in elevation) leading to poor text recognition. Such embodiments appear to have the following benefits: improving user experience by providing further robustness to various orientations of a camera relative to text being imaged and so perspective correction is helpful in improving automatic recognition of text, in images captured by handheld cameras in a wider range of real world scenarios.

Figure 5B:
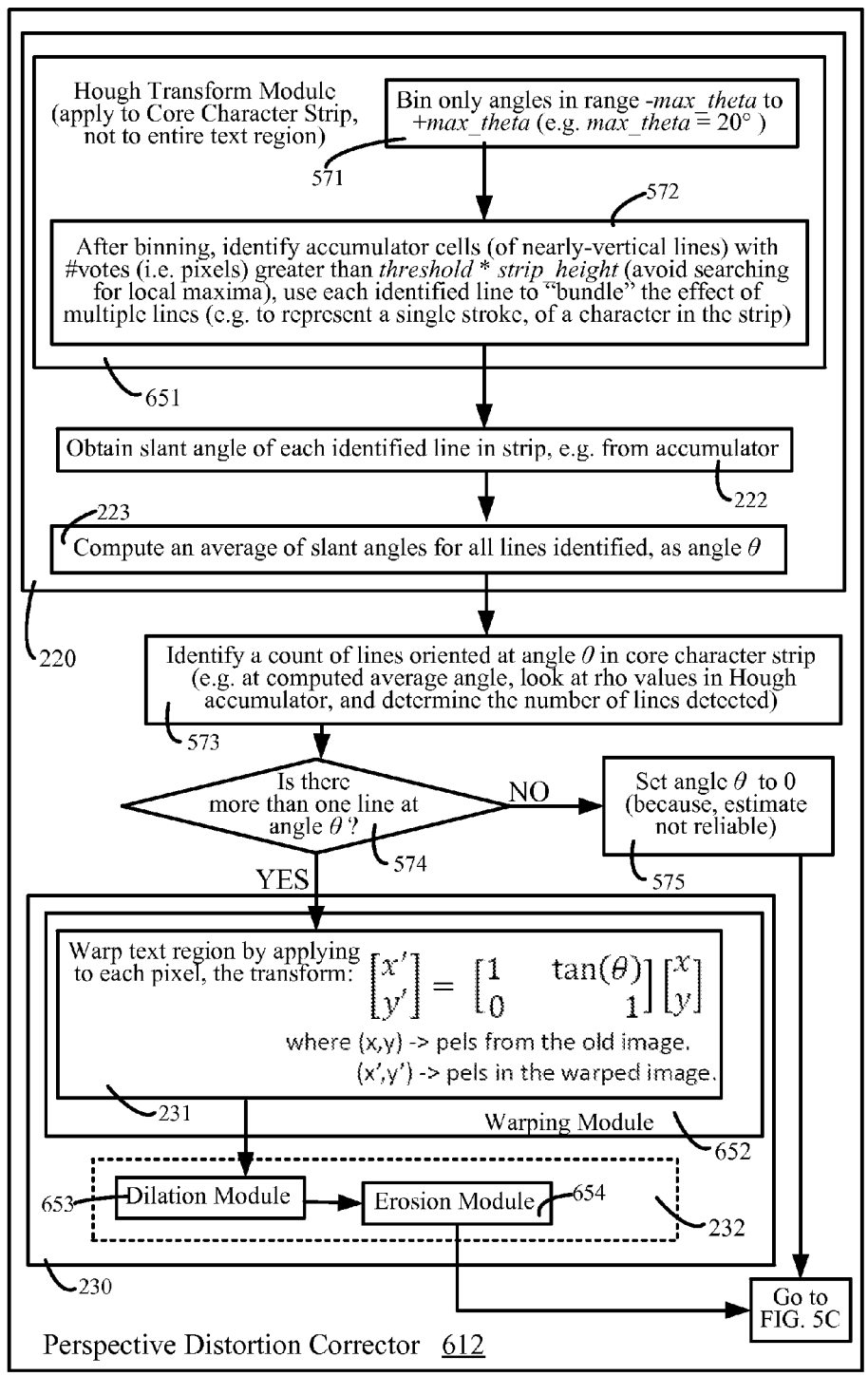
FIG. 5B illustrates, in a flow chart, performance of operation 220 of FIG. 2 by a perspective correction module of some embodiments.
Figure 5C:
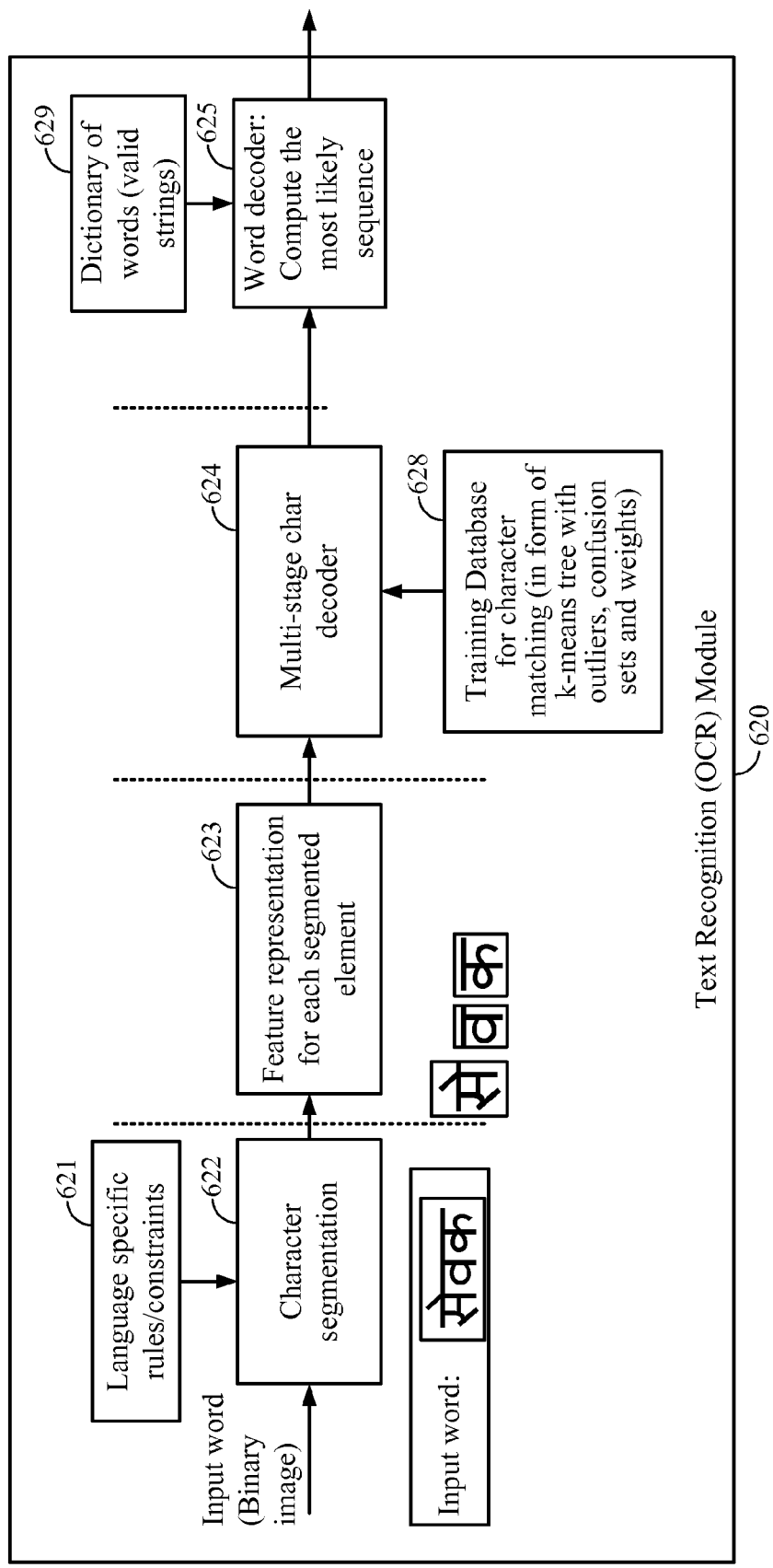
FIG. 5C illustrates, in a high level block diagram, a text recognition module 620 that performs operation 230 of FIG. 2.

Several embodiments of a mobile device 601 are implemented as illustrated in one or more of FIGS. 5A, 5B and 5C described next. In several embodiments, mobile device 601 includes a plurality of instructions in software 610 in memory 501 that when executed by processor(s) 604 implements a text region extractor 611, e.g. by performing an operation 510 (FIG. 5A) wherein one or more regions are extracted from an image, e.g. based on variation in intensities of pixels in the image, followed by operations 520,530, 540, 550, 552 and 560 as described below. In operation 510, pixels in an image may be identified in a set (which may be implemented as a list) that in turn identifies a region $Q_i$ which includes a local extrema of intensity (such as local maxima or local minima) in the image. Such a region $Q_i$ may be identified in operation 510 as being maximally stable relative to one or more intensities in a range i−Δ to i+Δ, each intensity i being used as a threshold (with A being a parameter input to an MSER method) in comparisons with intensities of a plurality of pixels included in region $Q_i$ to identify respective regions $Q_{i-\Delta}$ and $Q_{i+\Delta}$.

Such a region (which may constitute a "connected component") may be identified in operation 510 (FIG. 5A) by use of any MSER method, e.g. as described in an article entitled "Robust Wide Baseline Stereo from Maximally Stable Extremal Regions" by J. Matas, O. Chum, M. Urban, and T. Pajdla, BMVC 2002, 10 pages that is incorporated by reference herein in its entirety. Other methods can be used to perform connected component analysis and identification of regions in operation 510 e.g. as described in an article entitled "Application of Floyd-Warshall Labelling Technique: Identification of Connected Pixel Components In Binary Image" by Hyunkyung Shin and Joong Sang Shin, published in Kangweon-Kyungki Math. Jour. 14 (2006), No. 1, pp. 47-55 that is incorporated by reference herein in its entirety, or as described in an article entitled "Fast Connected Component Labeling Algorithm Using A Divide and Conquer Technique" by Jung-Me Park, Carl G. Looney and Hui-Chuan Chen, published Matrix (2000), Volume: 4, Issue: 1, Publisher: Elsevier Ltd, pages 4-7 that is also incorporated by reference herein in its entirety.

After one or more regions in the image are identified, text region extractor 611 in mobile device 601 of some embodiments performs skew presence detection in an operation 520 (see FIG. 5A), followed by skew correction. Operation 520 is performed prior to classification of pixels into text or non-text in operation 560 (described below). Moreover, operation 520 is performed prior to merging of regions that are adjacent to one another (e.g. in operation 540), and also prior to binarization (e.g. in operation 550). During operation 520, mobile device 601 calculates a value of an indicator of skew locally, in a specific region. Some embodiments of processor(s) 604 compute a value of the indicator of skew for each region $Q_i$, by using (a) an area of the rectangle that tightly fits the region $Q_i$ (also called "minimum bounding rectangle") and (b) a count of pixels in the region $Q_i$ to obtain a metric $M_i$, which may be used to determine skew of the region i. In several such embodiments, metric $M_i$ is compared with a threshold t1 to determine whether or not skew in the region $Q_i$ is acceptable or not (e.g. not acceptable when skew angle of a region is greater than ±5 degrees), thereby to obtain a binary-valued indicator of skew in each region $Q_i$. In other such embodiments, the metric $M_i$ is directly used, as a real-valued indicator of skew in each region i.

A value of an indicator of skew that is computed in operation 520 for each region is stored either individually (for each region) or in aggregate (across multiple regions), at a specific location in memory 501. Some embodiments of mobile device 601 increment in the memory 501 a skew count for the entire image each time a region is marked as skew-present. Other embodiments label each region individually in memory as either skew-present or skew-absent. It is not known at this stage (e.g. in operation 520) whether or not a feature formed by the region is text or non-text, although a value of an indicator of skew is being determined for the region. In several aspects, mobile device 601 applies a predetermined test to multiple values of the indicator of skew (and/or the metric of skew) that are computed for multiple regions respectively in the image, and the multiple values are used to determine whether skew is present globally, in the image as a whole. Certain embodiments of operation 520 may use statistical methods to compute mean or median of the multiple values, followed by filtering outliers among the multiple values, followed by re-computation of mean or median of the filtered values and comparison to a threshold (e.g. greater than ±5 degrees) to determine whether or not skew in the image as a whole is acceptable.

After operation 520, when skew is found to be acceptable across multiple regions of an image, text region extractor 611 in mobile device 601 of some embodiments performs an operation 530 (FIG. 5A) which checks for presence of a line of pixels of a common binary value, and thereafter performs an operation 540 that uses predetermined rules to merge regions that are adjacent to one another, when one of the regions satisfies the test for line presence (in operation 530). Operation 540 is followed by operation 550 in a binarization module that binarizes bounding boxes of regions (merged or unmerged) resulting from operation 540.

Operation 550 is followed in text region extractor 611 by an operation 552 (FIG. 5A) to verify that a line of pixels of a common binary value is present in the binarized block of a region (whether or not merged), followed by operation 560 (FIG. 5A) to classify binarized blocks as text or non-text (e.g. by use of a neural network and/or based on variance in stroke width). Operation 552 can be implemented in a verification module differently in different embodiments of text region extractor 611. After classification in operation 560, one or more blocks that are classified as text are supplied by text region extractor 611 to a perspective distortion corrector 612, illustrated in FIG. 5B.

Operations 540, 550, 552 and 560 described above are performed by text region extractor 611 when skew is acceptable. However, when text region extractor 611 finds skew to be not acceptable in operation 520, text region extractor 611 may invoke a user interface in mobile device 601 to obtain user input to correct skew in the image. For example, certain embodiments of operation 520 may cause the user interface of mobile device 601 play an audio message (e.g. "please correct skew") via a speaker 608 (FIG. 6), or display a symbol (e.g. the plus sign "+") on screen 607 (FIG. 6), or do both (i.e. play audio message and also display an on-screen symbol).

In response to such a prompt by mobile device 601, a user may physically rotate the mobile device 601, so that skew is reduced (e.g. to within ±5 degrees). Rotation of mobile device 601 may be sensed by a motion sensor (such as an accelerometer) included in mobile device 601, and the sensed motion is supplied to text region extractor 611 which uses the sensed motion to correct skew in the image. Some embodiments of the user interface in mobile device 601 display a symbol superimposed on the image on screen 607 included as a portion of a live video (or camera preview, depending on the embodiment), and the symbol is made user rotatable. For example, the symbol may be rotated by touching and sliding on screen 607, a tip of a finger of a hand of a user (to move an area of touch on screen 607) in a rotation movement.

In some embodiments, mobile device 601 includes logic (e.g. software instructions executed by processor(s) 604) to automatically detect skew as follows. Mobile device 601 checks whether at a candidate angle, one or more attributes of a histogram of counts of pixels of a common binary value meet at least one test for presence of a straight line of pixels in the region. Some embodiments detect a peak of the histogram of a block at the candidate angle by comparing a highest value Np in the counters to a mean Nm of all values in the counters e.g. by forming a ratio therebetween as Np/Nm, followed by comparing that ratio against a predetermined limit (e.g. ratio >1.75 indicates peak).

When a peak is found (e.g. the predetermined limit is exceeded by the ratio), some embodiments of mobile device 601 perform an additional test wherein a y-coordinate of the peak is compared with a height of the block to determine whether the peak occurs in an upper 30% of the block. If the additional test is found to be satisfied, in some embodiments of mobile device 601 the candidate angle (at which the pixel line is determined to be present) is selected for use in a voting process, and a counter associated with the candidate angle is incremented. Mobile device 601 repeats the process described in this paragraph with additional blocks of the image, and after a sufficient number of such votes have been counted (e.g. 10 votes), the candidate angle of a counter which has the largest number of votes is used as the skew angle, which is then used to automatically correct skew in each block (e.g. by rotating each block through negative of the skew angle).

After a region is classified as text, perspective distortion corrector 612 in mobile device 601 may perform acts 571 and 572 (FIG. 5B) to implement the operation 220 (described above, see FIG. 2). Specifically, processor(s) 604 in mobile device 601 may be programmed with second instructions in software 610 in memory 501 to apply the Hough Transform to bin only the angles in the range −max_theta to +max_theta around the vertical in act 571, followed by act 572 of identifying one or more cells in accumulator 641 which represent nearly-vertical lines of pixels and have a count of the number of votes therein greater than a threshold×strip_height, wherein strip_height is height of a strip (e.g. core character strip) of the text region as described above. In act 572 of some embodiments, no search is done for a local maxima, although other embodiments may identify a line at the local maxima. Each line identified in act 572 of some embodiments represents multiple lines (which are thereby bundled). Specifically, as noted above, each identified line may "bundle" (or represent) multiple lines passing through multiple pixels in a single stroke (or glyph) of a character in the strip, with each line in the multiple lines identified by the Hough Transform being one pixel wide. Then, acts 222 and 223 (described above) are performed by perspective distortion corrector 612.

On completion of act 223, the perspective distortion corrector 612 in mobile device 601 of some embodiments performs acts 573-575. Specifically, in act 573, processor(s) 604 identify a count of lines that are oriented at the angle θ obtained by averaging (in act 223). For example, in act 573, processor(s) 604 may check the rho values (which represent distances of lines from origin) in the accumulator 641 (FIG. 6) of the Hough Transform to determine a count of the number of lines oriented at the angle θ to vertical. Next, in act 574, processor(s) 604 check on whether there is more than one line oriented at the angle θ and if not then act 575 is performed to set the angle θ to 0, because the estimate is not reliable, followed by performing the method of FIG. 5C. In act 574, if the answer is yes, then operation 230 (described above) is performed, also followed by performing the method of FIG. 5C.

In operation 230 in some embodiments of perspective distortion corrector 612, acts 231 and 232 are performed as described above. In performing the act 231, processor(s) 604 compute new x coordinates denoted as x' based on existing coordinates (x, y) in a list of pixels of a region of text received in act 218 (FIG. 2) as follows: x'=x+y tan (θ). Thus, several embodiments of processor(s) 604 compute new first coordinates by adding to each first coordinate among multiple first coordinates (of multiple pixels), a product of a corresponding second coordinate and tan (θ). Note that in the several embodiments, the y coordinates are kept the same, and therefore y'=y.

Figure 4F:
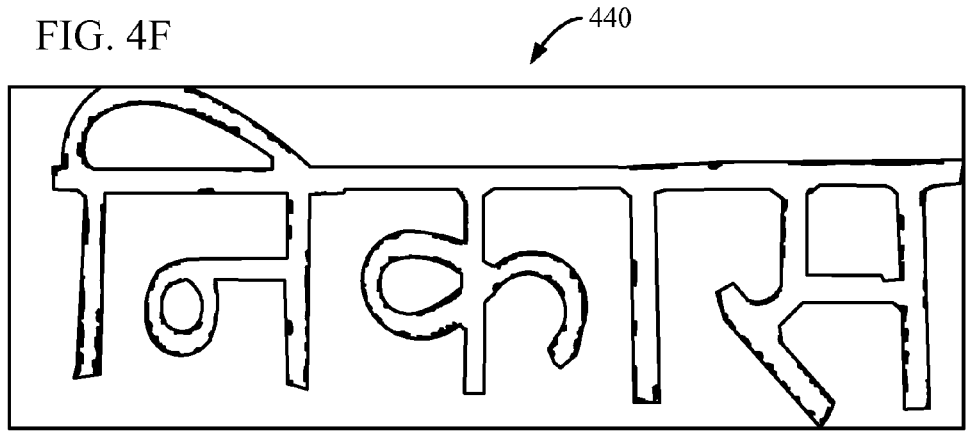
FIG. 4F illustrates a result of erosion (also as per act 232 in FIG. 3A) of the dilated text region of FIG. 4E by 1 pixel in each direction.

Accordingly, in certain embodiments, processor(s) 604 are programmed to use the angle θ to at least change multiple first coordinates (e.g. x coordinates) of multiple pixels in at least one character in a region of text, thereby to generate at least multiple changed first coordinates (e.g. x' coordinates). In such embodiments, multiple second coordinates of multiple pixels (e.g. y coordinates) in the at least one character are stored unchanged with multiple changed first coordinates (e.g. x' coordinates). Thus, for each pixel with the coordinates (x, y) in at least one character in the text region (including, for example, coordinates of a line of pixels in a shiro-rekha and any upper and/or lower maatra of the at least one character), processor(s) 604 are programmed to store new coordinates (x', y') in memory 501, for a perspective corrected region (e.g. see region 420 in FIG. 4D). Thereafter, act 232 is performed by processor(s) 604, e.g. to dilate by 1 pixel (as shown in FIG. 4E) followed by eroding by 1 pixel (as shown in FIG. 4F).

Mobile device 601 (FIG. 6) of some embodiments that performs a method of the type shown in FIGS. 2, 3A, 3B and 5B can be any hand-held device, such as a smartphone that includes a camera 605 (FIG. 6) of the type described above to generate an image of a real world scene (e.g. scene of bill board 100) that is then processed to identify any characters of Devanagari therein. As noted above, mobile device 601 may further include sensors 606 that provide information on movement of mobile device 601, such as an accelerometer, a gyroscope, a compass, or the like. Mobile device 601 may use an accelerometer and a compass and/or other sensors to sense tilting and/or turning in the normal manner, to assist processor (s) 604 in determining the orientation and position of a predetermined symbol in an image captured in mobile device 601. Instead of or in addition to sensors 606, mobile device 601 may use images from a camera 605 to assist processor(s) 604 in determining the orientation and position of mobile device 601 in any other manner, depending on the embodiment.

Also, mobile device 601 may additionally include a graphics engine 1004 and an image processor 1005 that are used in the normal manner. Mobile device 601 may optionally include a text recognition (OCR) module 620 (e.g. implemented by one or more processor(s) 604 executing a plurality of instructions in software 610 in memory 501) to identify characters in regions of text in blocks received as input from perspective distortion corrector 612 (when one or more groups of instructions, included in software therein are executed by processor(s) 604).

Several embodiments of mobile device 601 include language specific rules 621 and modules 622, 623, 624, 625, 62, 628 and 629 (FIG. 5C) that implement logic to perform a method of the type described herein. Such modules may be implemented either in hardware or in software executed by processor 604 or in a combination thereof, as described below in reference to FIG. 5C. Specifically, mobile device 601 of some embodiments includes a character segmentation module, e.g. module 622 (FIG. 5C) that slices a block of a text region (with the block being identified by a bounding box thereof), based on language specific rules in a memory 501 of mobile device 601.

A sequence of sub-blocks generated by module 622 is input to a feature representation module, e.g. module 623 (FIG. 5C) that prepares a feature vector of N elements, for each block in the sequence. Depending on the embodiment, any type of feature vector may be used by module 623 to represent pixels in each sub-block (containing pixels indicative of a character of text to be OCRed, including a shiro-rekha and any upper maatra that may be present as shown in FIG. 5C for the letter स).

Some embodiments may subdivide each sub-block containing pixels of a character into a predetermined number of sub-sub-blocks, e.g. 2×2 or 4 sub-sub-blocks, 4×4 or 16 sub-sub-blocks or even 5×4 or 20 sub-sub-blocks. Then, two dimensions are formed for a feature vector to keep count of black-to-white and white-to-black transitions in the horizontal direction (e.g. left to right) along a row of pixels in each sub-sub-block of a sub-block, and two additional dimensions are formed for the feature vector to keep count of black-to-white and white-to-black transitions in the vertical direction (e.g. bottom to top) along a column of the sub-block.

Depending on the embodiment, additional counts that may be included in such a feature vector are counts of absence of changes in intensity values of pixels. For example, such additional counts may keep track of number of occurrences black-to-black (i.e. no change) intensity values and number of occurrences of white-to-white (also no change) intensity values in the horizontal direction (e.g. left to right) along a row of pixels in the sub-block. Similarly, number of occurrences of black-to-black intensity values and number of occurrences of white-to-white (also no change) intensity values in the vertical direction (e.g. top to bottom) along a column of pixels in the sub-block.

The feature vectors formed by module 623 are input to a multi-stage character decoder, e.g. module 624 (FIG. 5C) that generates as its output a group of characters as alternatives to one another, optionally with confidence measures for each character in the group as representing a character of text in a specific sub-block. In some embodiments of the type described below, multi-stage character decoder, e.g. module 624 includes a first stage that searches among a set of predetermined feature vectors and a second stage that searches, for each identified character, a corresponding set of characters that are known to be incorrectly identified to be one another (called "confusion set", which includes the identified character). The just-described set of predetermined feature vectors and the just-described confusion set are stored in a database as two portions of information 628 that is used by a decoder, e.g. module 624 in two stages. Depending on the embodiment, either or both portions of the just-described information may be changed by feedback from the word decoder, e.g. module 625.

In several embodiments, information 628 includes as a first portion used in the first stage, a tree whose leaf nodes hold feature vectors, and the tree is traversed in the first stage e.g. by comparing the feature vector of a sub-block with corresponding feature vectors at one or more intermediate nodes by use of Euclidean distance, to identify a specific leaf node. In certain embodiments, a leaf node in the tree includes a mean of feature vectors that are representative of a character (e.g. a mean over multiple shapes in different fonts of a commonly-occurring character), as well as one or more feature vectors that are selected for being outliers among the feature vectors representative of the character. In some embodiments, information 628 includes as a second portion used in the second stage, a set of weights that identify elements of the feature vector known to be sufficient to distinguish between characters in the confusion set. Each group of characters identified by a decoder, e.g. module 624 for a corresponding sub-block are input to a word decoder, e.g. module 625 (FIG. 5C) that collects such groups for all sub-blocks in a block of the text region, and then outputs a word that has been selected from a dictionary 629. Dictionary 629 of some embodiments holds a predetermined set of words and/or sequences of characters that have been obtained (e.g. from a prior art dictionary) by removing accent marks.

As noted above, processor 604 may be programmed in some embodiments to perform one or more acts in the method illustrated in FIGS. 2, 3A, 3B and 5B, although in some embodiments, one or more acts may be performed in hardware or any combination of hardware and software. For example, in some embodiments, the above-described acts 571 and 572 are performed by a Hugh Transform Module 651 (FIG. 5B) included in perspective distortion corrector 612. Moreover, in several such embodiments, the above-described act 231 is performed by a Warping Module 652, in perspective distortion corrector 612. Furthermore, in certain embodiments, a Dilation Module 653 and Erosion Module 654 perform act 232 (described above) in perspective distortion corrector 612.

In some embodiments, mobile device 601 may include, in addition to memory 501, one or more other types of memory such as flash memory (or SD card) 1008 and/or a hard disk and/or an optical disk (also called "secondary memory") to store data and/or software for loading into memory 501 (also called "main memory") and/or for use by processor(s) 604. Mobile device 601 may further include a wireless transmitter and receiver in transceiver 1010 and/or any other communication interfaces 1009. It should be understood that mobile device 601 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 601 of the type described above may include other position determination methods such as object recognition using "computer vision" techniques. The mobile device 601 may also include means for remotely controlling a real world object which may be a toy, in response to user input on mobile device 601 e.g. by use of transmitter in transceiver 1010, which may be an IR or RF transmitter or a wireless a transmitter enabled to transmit one or more signals over one or more types of wireless communication networks such as WiFi, cellular wireless network or other network. The mobile device 601 may further include, in a user interface, a microphone and a speaker (not labeled). Of course, mobile device 601 may include other elements unrelated to the present disclosure, such as a read-only-memory 1007 which may be used to store firmware for use by processor(s) 604.

Also, depending on the embodiment, a mobile device 601 may perform reference free tracking and/or reference based tracking using a local detector in mobile device 601 to detect characters of text in images, in implementations that operate the OCR module 620 to identify, e.g. characters of Devanagari alphabet in an image. Any one or more of decoders, word dictionary and feedback module may be implemented in software (executed by one or more processors or processor cores) or in hardware or in firmware, or in any combination thereof.

In some embodiments of mobile device 601, functionality in the above-described OCR module 620 is implemented by one or more processor(s) 604 executing the software 610 in memory 501 of mobile device 601, although in other embodiments such functionality is implemented in any combination of hardware circuitry and/or firmware and/or software in mobile device 601. Hence, depending on the embodiment, various functions of the type described herein may be implemented in software (executed by one or more processors or processor cores) or in dedicated hardware circuitry or in firmware, or in any combination thereof.

Accordingly, depending on the embodiment, any one or more components of OCR module 620 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of non-transitory computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware 1013 (FIG. 6) or software 610, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying software instructions (also called "computer instructions") may be used in implementing the methodologies described herein. For example, software 610 (FIG. 6) may include program codes stored in memory 501 and executed by processor(s) 604. Memory may be implemented within or external to the processor(s) 604. If implemented in firmware and/or software, the functions may be stored as one or more instructions or code on a computer-readable medium. Examples include any non-transitory computer-readable storage medium encoded with a data structure and non-transitory computer-readable storage medium encoded with a computer program.

One or more non-transitory computer-readable storage media includes physical computer storage media. A non-transitory computer-readable storage medium may be any available non-transitory medium that can be accessed by a computer, and holds information (such as software and/or data). By way of example, and not limitation, such a non-transitory computer-readable storage medium can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media described herein.

Although specific embodiments have been described for instructional purposes, the other embodiments will be readily apparent in view of this description. Hence, although an item shown in FIG. 6 of some embodiments is a mobile device 601, in other embodiments the item (which includes memory 501 and processor(s) 604) is implemented by use of form factors that are different, e.g. in certain other embodiments the item is a mobile platform (such as a tablet, e.g. iPad available from Apple, Inc.) while in still other embodiments the item is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s) with sensors and user input circuitry enclosed in a housing that is small enough to be held in a hand.

Depending on a specific symbol recognized in a handheld camera captured image, a user can receive different types of feedback depending on the embodiment. Additionally haptic feedback (e.g. by vibration of mobile device 601) is provided by triggering the haptic feedback circuitry 1018 (FIG. 6) in some embodiments, to provide feedback to the user when text is recognized in an image. Instead of the just-described haptic feedback, audio feedback may be provided via a speaker in mobile device 601, in other embodiments.

Various adaptations and modifications may be made without departing from the scope of the described embodiments, as will be readily apparent to the skilled artisan in view of this description. Accordingly, numerous such embodiments are encompassed by the appended claims.

The invention claimed is:

1. A method to improve automatic recognition of text, the method comprising:
   receiving a plurality of regions in an image of a scene of real world captured by a camera;
   rotating at least the plurality of regions through a common angle $\phi$, to obtain a set of skew-corrected regions;
   after the rotating, applying to the set of skew-corrected regions one or more tests that determine presence of text, to identify a subset of regions likely to be text;
   after the applying, determining a slant angle $\theta$ of at least a portion of a region, by combining a plurality of angles of a plurality of lines relative to a common direction, each line in the plurality of lines representing multiple line segments in the region that are at least one pixel wide, located adjacent to one another, and formed by pixels of text;
   using the slant angle $\theta$ to change first coordinates of at least pixels in the portion, whereby a first height at a first end of the portion and a second height at a second end of the portion remain unchanged after the using; and
   storing in a memory, at least changed first coordinates generated by the using;
   wherein the receiving, the rotating, the applying, the determining, the using and the storing are performed by one or more processors.

2. The method of claim 1 wherein:
   the portion is a strip extracted from a location below a y-coordinate of a peak in a histogram, of counts of pixels of a common binary value in each row among a plurality of rows in the region.

3. The method of claim 2 wherein:
   each line in the plurality of lines is detected for satisfying a test on having a length within the portion larger than a predetermined fraction of a height of the portion.

4. The method of claim 1 wherein:
   the common direction used to determine the angle $\theta$ is perpendicular to a longitudinal direction of the skew-corrected region.

5. The method of claim 1 wherein a perspective corrected region is obtained by the using, and the method further comprising, after the using:
   dilating the perspective corrected region by adding a set of additional pixels to obtain a dilated region; and
   eroding the dilated region by removing a subset in the set of additional pixels added by the dilating.

6. The method of claim 1 further comprising:
   clustering regions in the subset, when a test of geometry is satisfied;
   wherein the clustering is performed after the applying and before the determining.

7. The method of claim 1 further comprising:
   classifying regions in the subset as text/non-text, by use of a neural network or stroke width;
   wherein the classifying is performed after the applying and before the determining.

8. A non-transitory computer-readable storage medium comprising a plurality of instructions to at least one processor to improve automatic recognition of text, the plurality of instructions comprising:
   first instructions to receive a plurality of regions in an image of a scene of real world captured by a camera;
   second instructions to rotate at least the plurality of regions through a common angle $\phi$, to obtain a set of skew-corrected regions;
   to execute after execution of the second instructions to rotate, third instructions to apply to the set of skew-corrected regions one or more tests that determine presence of text, to identify a subset of regions likely to be text;
   to execute after execution of the third instructions to apply, fourth instructions to determine a slant angle $\theta$ of at least a portion of a region in the subset, by combining a plurality of angles of a plurality of lines relative to a common direction, each line in the plurality of lines representing multiple line segments in the region that are at least one pixel wide, located adjacent to one another, and formed by pixels of text;
   fifth instructions to use the slant angle $\theta$ to change first coordinates of at least pixels in the portion, whereby a first height at a first end of the portion and a second height at a second end of the portion remain unchanged after execution of the fifth instructions; and sixth instructions to store in a memory, at least changed first coordinates generated by execution of the fifth instructions.

9. The non-transitory computer-readable storage medium of claim 8 wherein:
the portion is a strip extracted from a location below a y-coordinate of a peak in a histogram, of counts of pixels of a common binary value in each row among a plurality of rows in the region.

10. The non-transitory computer-readable storage medium of claim 9 wherein:
each line in the plurality of lines is detected for satisfying a test on having a length within the portion larger than a predetermined fraction of a height of the portion.

11. The non-transitory computer-readable storage medium of claim 8 wherein:
the common direction used to determine the angle θ is perpendicular to a longitudinal direction of the skew-corrected region.

12. The non-transitory computer-readable storage medium of claim 8 wherein a perspective corrected region is obtained by execution of the fifth instructions to use, the plurality of instructions further comprising, configured to be executed after the sixth instructions:
seventh instructions to dilate the perspective corrected region by adding a set of additional pixels to obtain a dilated region; and
eighth instructions to erode the dilated region by removing a subset in the set of additional pixels added by the seventh instructions to dilate.

13. The non-transitory computer-readable storage medium of claim 8 further comprising:
instructions to cluster regions in the subset, when a test of geometry is satisfied;
wherein the instructions to cluster are to execute after execution of the third instructions to apply and before execution of the fourth instructions to determine.

14. The non-transitory computer-readable storage medium of claim 8 further comprising:
instructions to classify regions in the subset as text/non-text, by use of a neural network or stroke width;
wherein the instructions to classify are to execute after execution of the third instructions to apply and before execution of the fourth instructions to determine.

15. A mobile device comprising:
a camera;
a memory operatively connected to the camera to receive at least an image therefrom;
at least one processor operatively connected to the memory to execute a plurality of instructions stored in the memory;
wherein the plurality of instructions cause the at least one processor to:
rotate at least the plurality of regions through a common angle φ, to obtain a set of skew-corrected regions;
after rotation through the common angle φ, apply to the set of skew-corrected regions one or more tests that determine presence of text, to identify a subset of regions likely to be text;
after application of the one or more tests, determine a slant angle θ of at least a portion of a region in the subset, by combining a plurality of angles of a plurality of lines relative to a common direction, each line in the plurality of lines representing multiple line segments in the region that are at least one pixel wide, located adjacent to one another, and formed by pixels of text;
use the slant angle θ to change first coordinates of at least pixels in the portion, whereby a first height at a first end of the portion and a second height at a second end of the portion remain unchanged after the use; and
store in the memory, at least changed first coordinates generated by the use.

16. The mobile device of claim 15 wherein:
the portion is a strip extracted from a location below a y-coordinate of a peak in a histogram, of counts of pixels of a common binary value in each row among a plurality of rows in the region.

17. The mobile device of claim 16 wherein:
each line in the plurality of lines is detected for satisfying a test on having a length within the portion larger than a predetermined fraction of a height of the portion.

18. The mobile device of claim 15 wherein the plurality of instructions further cause the at least one processor to:
cluster regions in the subset, when a test of geometry is satisfied;
wherein the instructions to cluster are to execute after application of the one or more tests and before determination of the slant angle θ.

19. The mobile device of claim 15 wherein the plurality of instructions further cause the at least one processor to:
classify regions in the subset as text/non-text, by use of a neural network or stroke width;
wherein the instructions to classify are to execute after application of the one or more tests and before determination of the slant angle θ.

20. An apparatus to improve automatic recognition of text, the apparatus comprising:
means for receiving a plurality of regions in an image of a scene of real world captured by a camera;
means for rotating at least the plurality of regions through a common angle φ, to obtain a set of skew-corrected regions;
means, operable after rotation through the common angle φ, for applying to the set of skew-corrected regions one or more tests that determine presence of text, to identify a subset of regions likely to be text;
means, operable after application of the one or more tests, for determining a slant angle θ of at least a portion of a region in the subset, by combining a plurality of angles of a plurality of lines relative to a common direction, each line in the plurality of lines representing multiple line segments in the region that are at least one pixel wide, located adjacent to one another, and formed by pixels of text;
means for using the slant angle θ to change first coordinates of at least pixels in word the portion, whereby a first height at a first end of the portion and a second height at a second end of the portion remain unchanged after operation of the means for the using; and
means for storing in a memory, at least changed first coordinates generated by the means for using.

* * * * *